(12) United States Patent
Grubka et al.

(10) Patent No.: US 10,458,119 B2
(45) Date of Patent: Oct. 29, 2019

(54) ROOFING SHINGLES

(71) Applicant: Owens Corning Intellectual Capital, LLC, Toledo, OH (US)

(72) Inventors: Lawrence J. Grubka, Westerville, OH (US); David P. Aschenbeck, Newark, OH (US); Donn R. Vermilion, Newark, OH (US); Edward R. Harrington, Toledo, OH (US); William E. Smith, Pataskala, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 15/681,623

(22) Filed: Aug. 21, 2017

(65) Prior Publication Data

US 2018/0051465 A1 Feb. 22, 2018

Related U.S. Application Data

(60) Provisional application No. 62/377,929, filed on Aug. 22, 2016.

(51) Int. Cl.
| | | |
|---|---|---|
| *E04D 1/28* | (2006.01) | |
| *E04D 1/22* | (2006.01) | |
| *E04D 5/02* | (2006.01) | |
| *B32B 5/16* | (2006.01) | |
| *E04D 5/14* | (2006.01) | |
| *E04D 1/26* | (2006.01) | |
| *E04D 1/00* | (2006.01) | |

(52) U.S. Cl.
CPC ............... *E04D 1/28* (2013.01); *B32B 5/16* (2013.01); *E04D 1/22* (2013.01); *E04D 1/26* (2013.01); *E04D 5/02* (2013.01); *E04D 5/148* (2013.01); *E04B 2103/04* (2013.01); *E04D 2001/005* (2013.01)

(58) Field of Classification Search
CPC .. E04D 1/26; E04D 1/28; E04D 1/265; E04D 2001/005; E04D 1/36; E04D 1/20; E04D 5/148; E04D 5/02; E04B 2103/04; B32B 5/16; Y10T 428/24372
See application file for complete search history.

(56) References Cited

U.S. PATENT DOCUMENTS

| | | | | |
|---|---|---|---|---|
| 4,212,692 A | * | 7/1980 | Rasen | D04H 3/16 156/167 |
| 4,399,186 A | * | 8/1983 | Lauderback | B32B 11/10 442/374 |
| 4,795,760 A | * | 1/1989 | Lucke | C08K 5/01 521/83 |
| 4,817,358 A | | 4/1989 | Lincoln et al. | |
| 5,232,530 A | | 8/1993 | Malmquist et al. | |
| (Continued) | | | | |

FOREIGN PATENT DOCUMENTS

CA 2882545 A1 * 8/2015 ............... E04D 1/00

*Primary Examiner* — Ryan D Kwiecinski
*Assistant Examiner* — Matthew J Gitlin
(74) *Attorney, Agent, or Firm* — Calfee, Halter & Griswold LLP

(57) ABSTRACT

A shingle including a substrate having a top surface and a bottom surface, an asphalt layer, a layer of granules, and a spacing layer is provided. The asphalt layer covers at least a portion of the top surface and the layer of granules is adhered to the asphalt layer. The spacing layer is attached beneath at least a portion of the bottom surface.

4 Claims, 19 Drawing Sheets

(56) References Cited

U.S. PATENT DOCUMENTS

| | | | |
|---|---|---|---|
| 5,305,569 A | 4/1994 | Malmquist et al. | |
| 5,951,796 A * | 9/1999 | Murray | C08G 18/10 156/78 |
| 7,048,990 B2 * | 5/2006 | Koschitzky | B32B 37/24 428/141 |
| 7,781,046 B2 * | 8/2010 | Kalkanoglu | B32B 5/24 428/143 |
| 8,898,987 B1 * | 12/2014 | Amatruda | E04D 1/28 52/557 |
| 9,242,432 B1 * | 1/2016 | Harrington, Jr. | B32B 11/00 |
| RE46,177 E * | 10/2016 | Vermilion | E04D 1/26 |
| 2003/0152747 A1 * | 8/2003 | Fensel | B32B 5/16 428/143 |
| 2006/0068188 A1 | 3/2006 | Morse et al. | |
| 2006/0179767 A1 * | 8/2006 | Miller | B32B 3/08 52/555 |
| 2007/0213418 A1 * | 9/2007 | Vermilion | C08J 9/0061 521/83 |
| 2009/0056261 A1 * | 3/2009 | Damgaard | E04D 5/10 52/408 |
| 2010/0196647 A1 * | 8/2010 | Bryson | E04D 1/20 428/40.3 |
| 2011/0056148 A1 * | 3/2011 | Jenkins | E04B 7/22 52/90.1 |
| 2011/0283646 A1 * | 11/2011 | Vermilion | E04D 1/26 52/539 |
| 2012/0094068 A1 * | 4/2012 | Wortelboer | B32B 3/266 428/140 |
| 2013/0025771 A1 * | 1/2013 | Vermilion | B32B 37/24 156/182 |
| 2013/0202852 A1 * | 8/2013 | Shiao | E04D 1/20 428/145 |
| 2013/0318911 A1 * | 12/2013 | Sealock | E04F 13/08 52/747.1 |
| 2014/0272244 A1 * | 9/2014 | Harrington, Jr. | E04D 1/28 428/57 |
| 2015/0259920 A1 * | 9/2015 | Hassan | E04D 1/16 428/148 |
| 2017/0321423 A1 * | 11/2017 | Aschenbeck | E04D 1/36 |

* cited by examiner

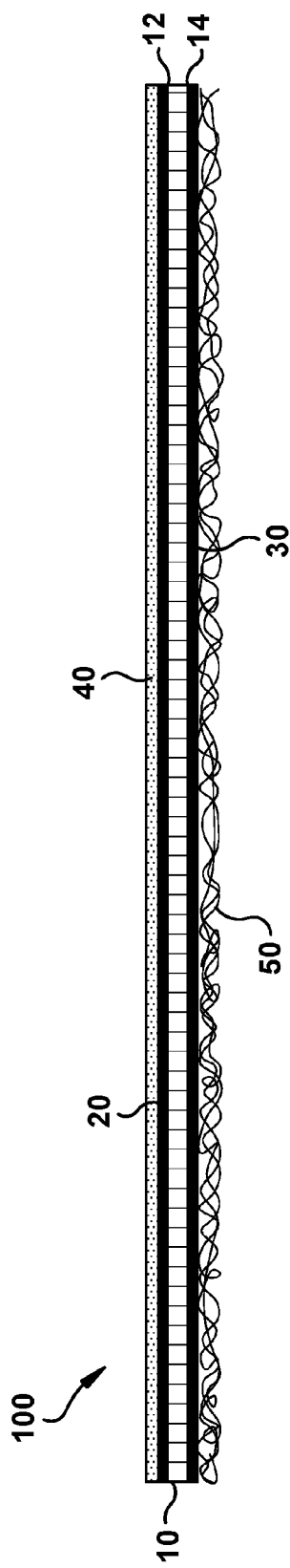
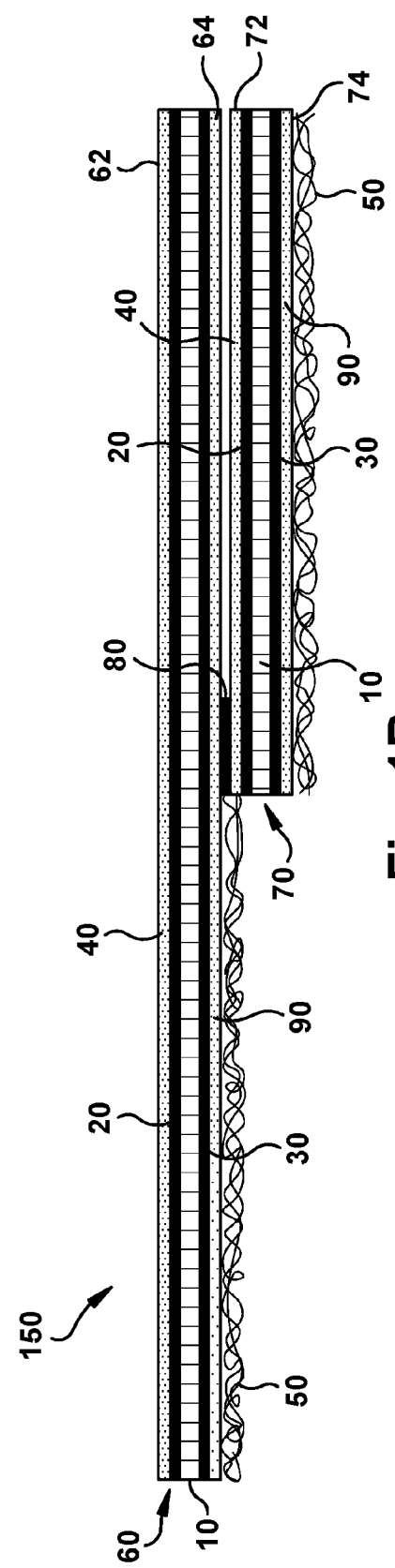

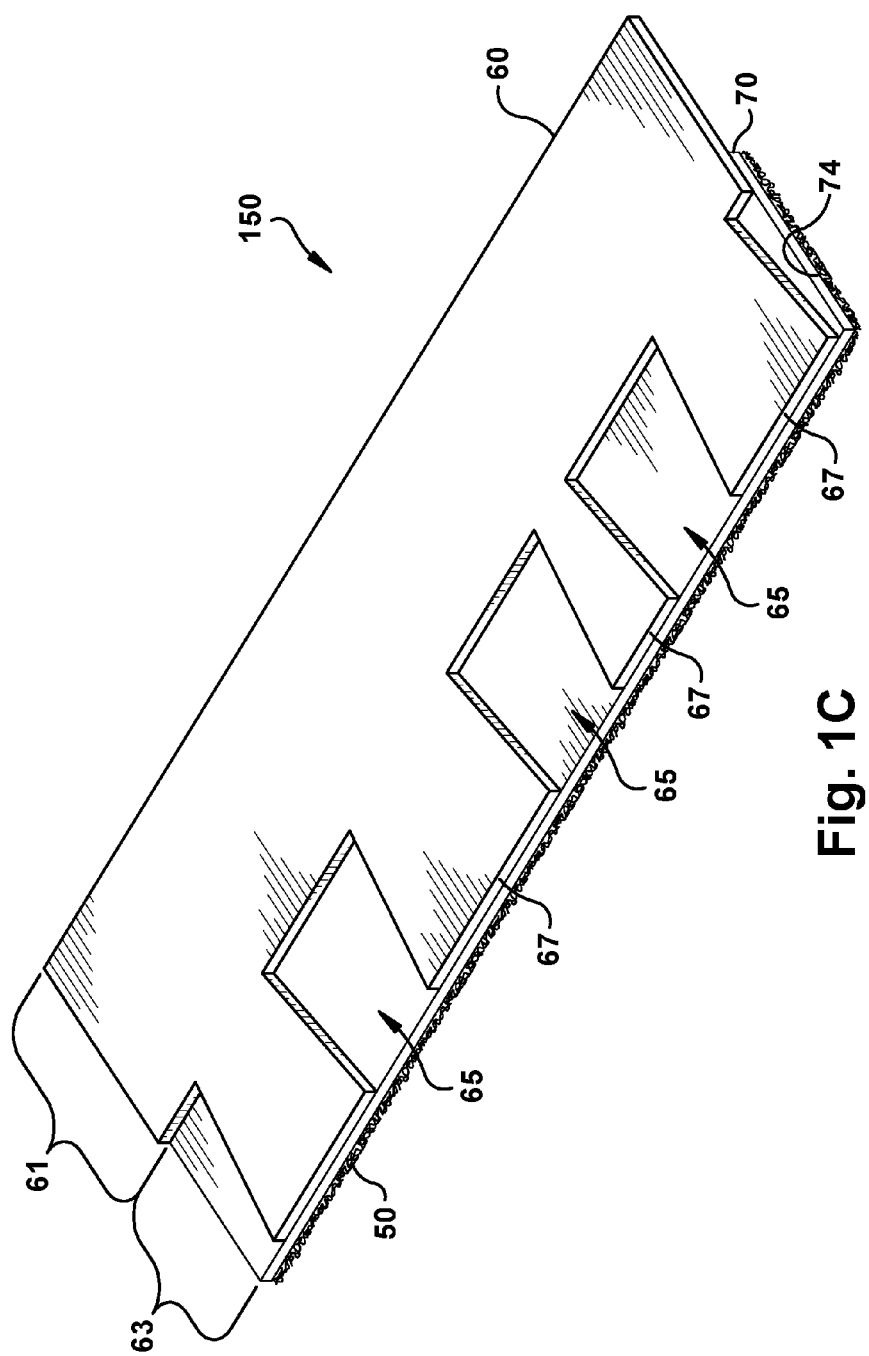

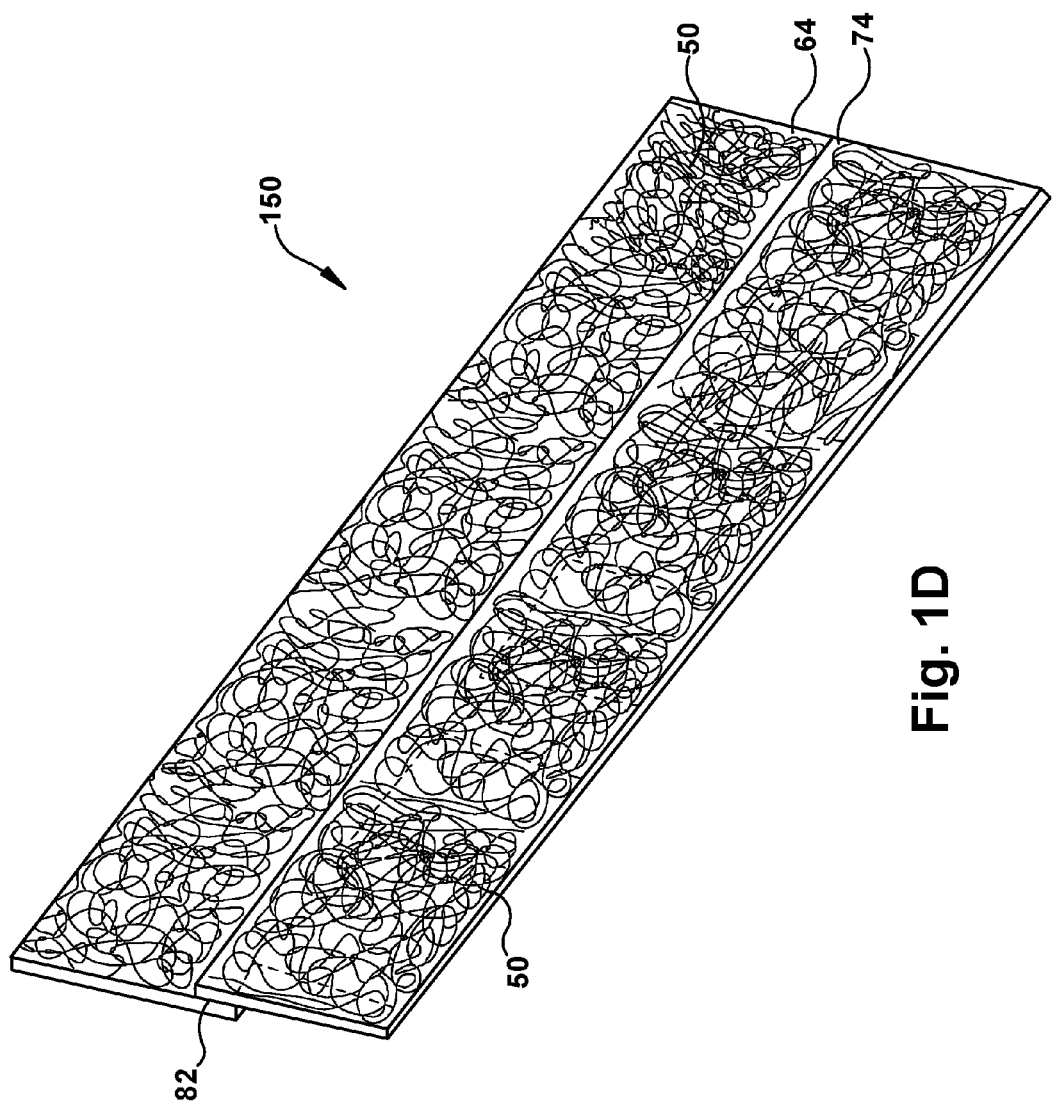

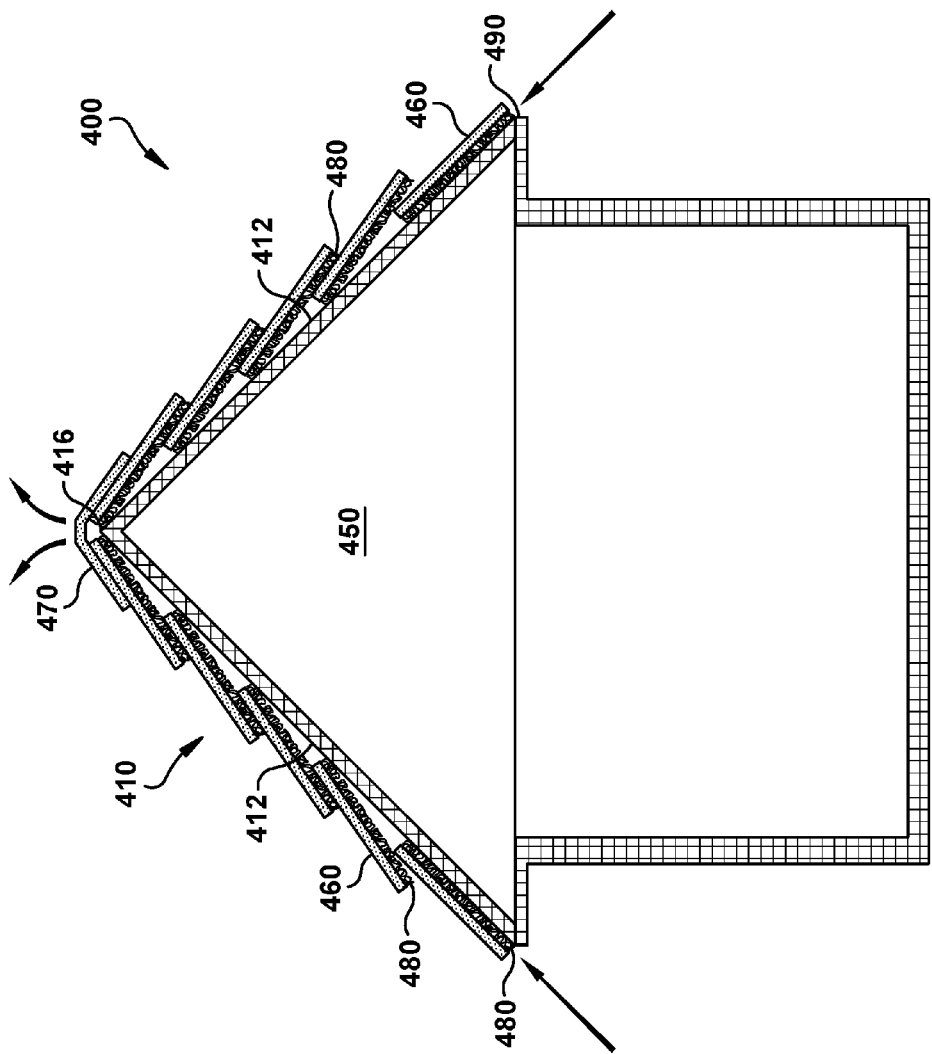

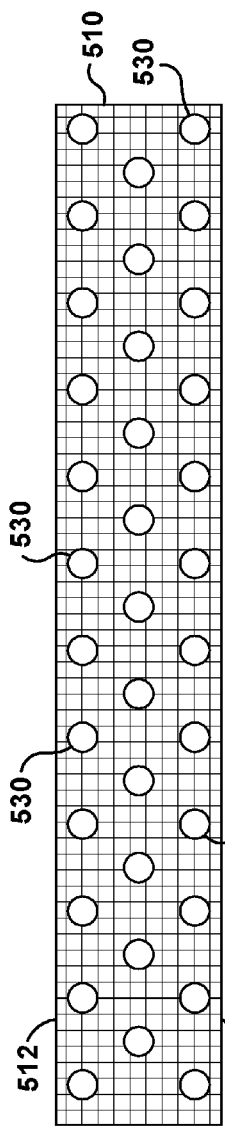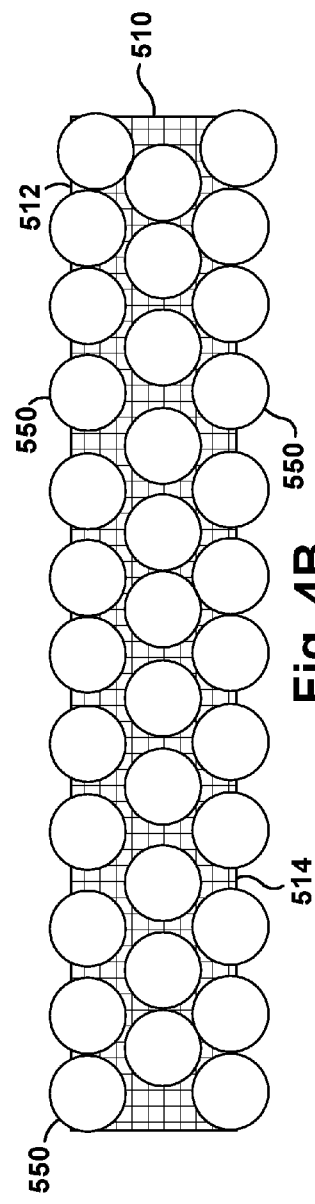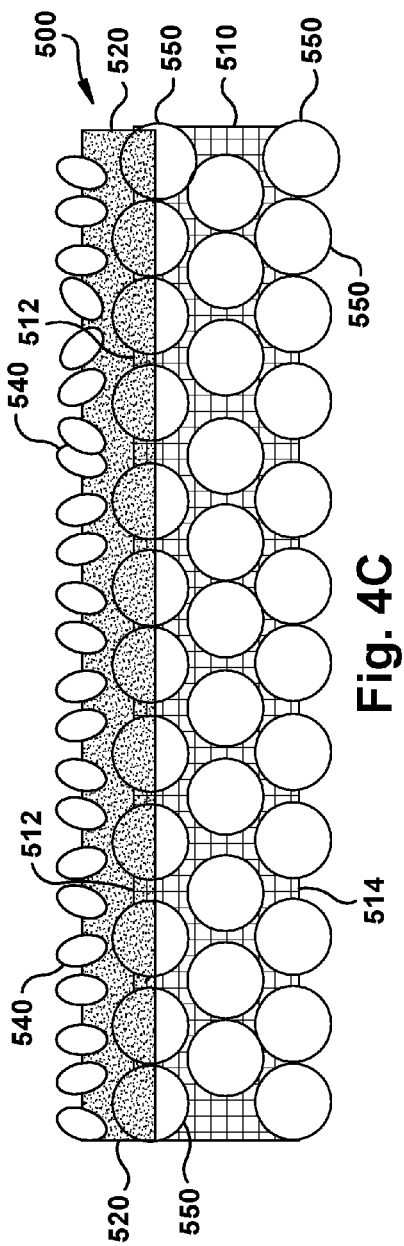

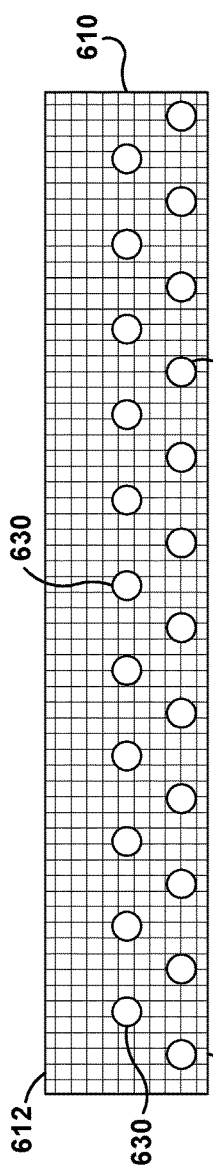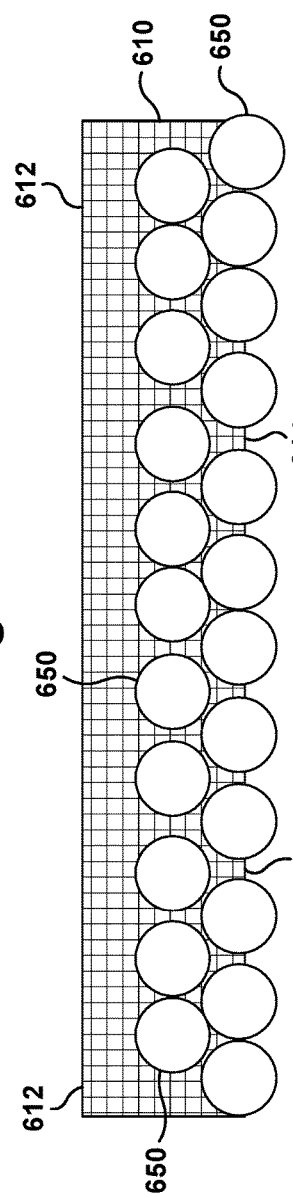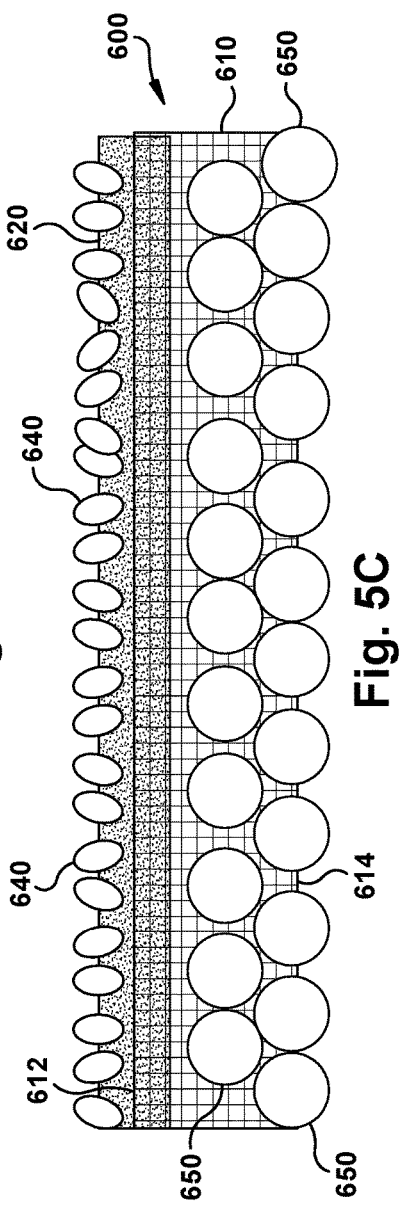

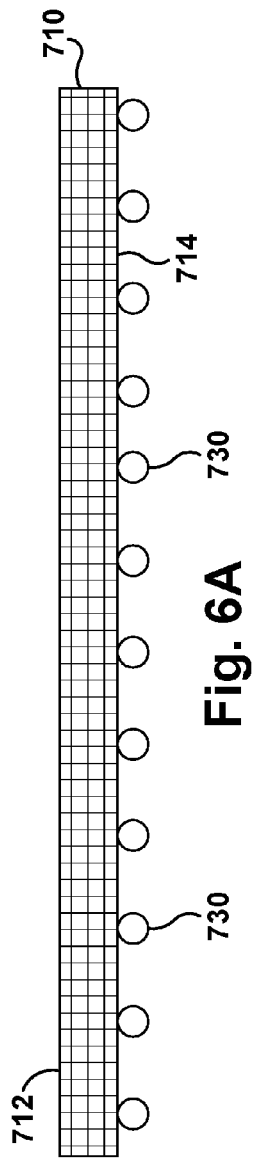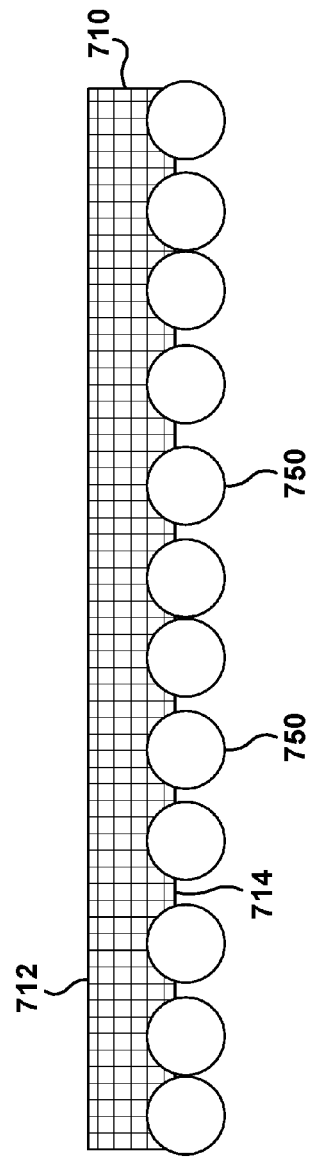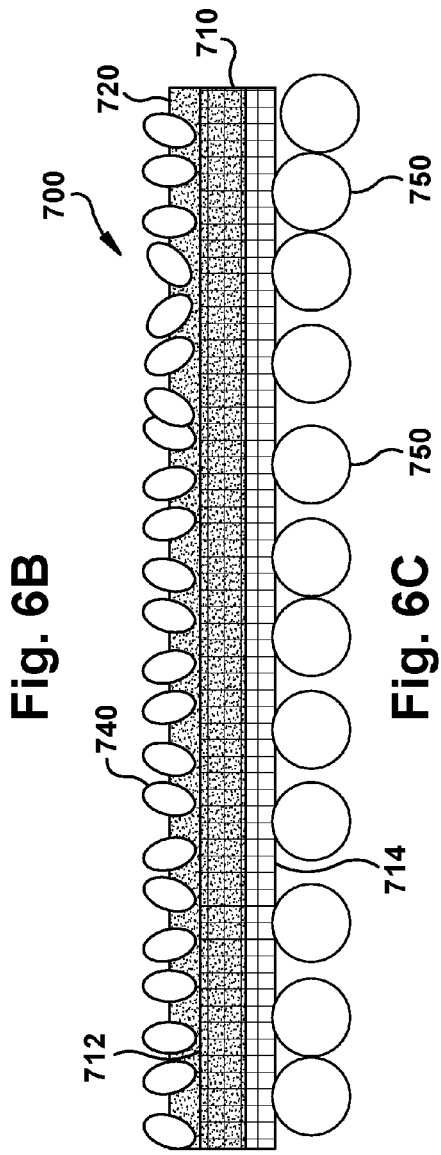

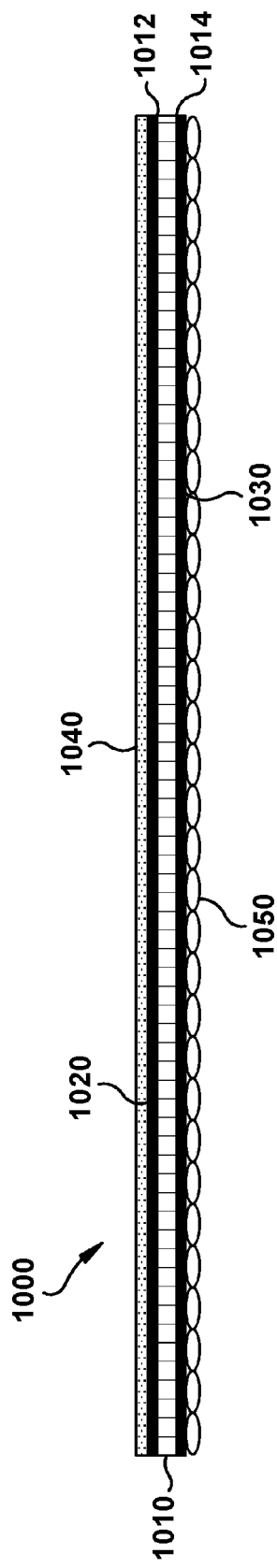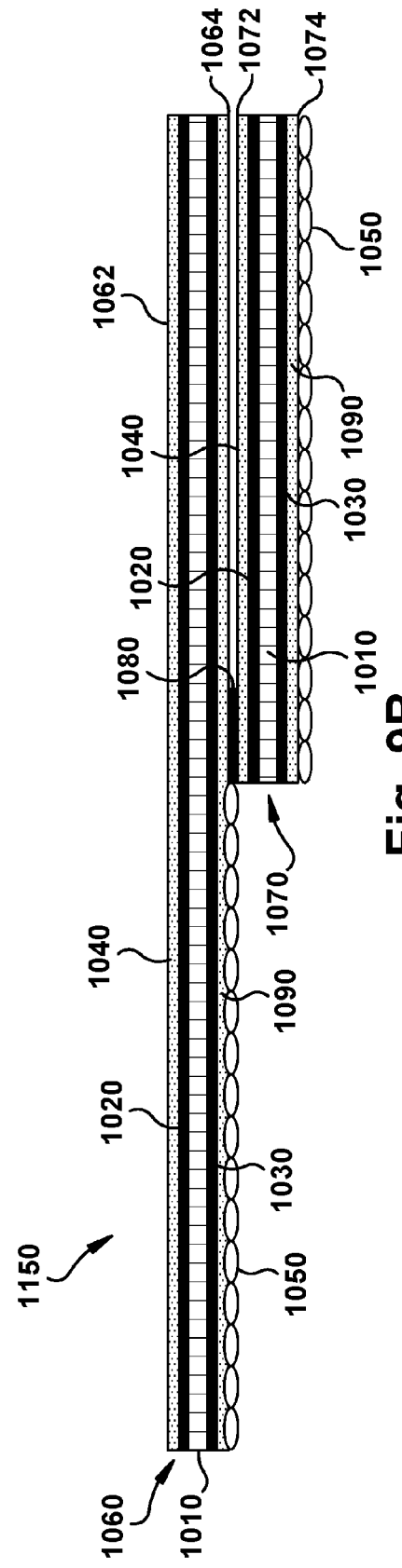

ROOFING SHINGLES

CROSS-REFERENCE TO RELATED APPLICATIONS

This application claims priority to and the benefit of U.S. Provisional Patent Application No. 62/377,929, filed Aug. 22, 2016, the entire content of which is incorporated by reference herein.

FIELD

The present disclosure relates to roofing materials and more particularly to asphalt-based roofing shingles having increased thickness without increasing the amount of asphalt coating utilized.

BACKGROUND

Asphalt-based roofing materials, such as roofing shingles, are installed on the roofs of buildings to provide protection from the elements and to give the roof an aesthetically pleasing look. Typically, roofing shingles are constructed on a substrate such as, for example, a glass fiber mat or an organic felt. An asphalt coating is applied to the substrate such that the asphalt saturates the substrate and forms an asphalt layer on both the top face and bottom face of the substrate. A decorative/protective layer of granules is applied to the asphalt layer on the top face of the substrate and a coating of sand or other particulate matter is applied to the asphalt layer on the bottom face of the substrate.

SUMMARY

The present disclosure includes exemplary embodiments of asphalt-based roofing shingles having increased thickness. In one exemplary embodiment, a shingle includes a substrate having a top surface and a bottom surface, a first asphalt layer, a layer of granules, and a spacing layer. The first asphalt layer covers at least a portion of the top surface and the layer of granules is adhered to the first asphalt layer. The spacing layer is attached beneath at least a portion of the bottom surface.

In one exemplary embodiment, a laminated shingle includes an overlay sheet, an underlay sheet, and a spacing layer. The overlay sheet is attached to the underlay sheet. The overlay sheet has a top overlay surface and a bottom overlay surface, and the underlay sheet has a top underlay surface and a bottom underlay surface. The spacing layer is attached to at least a portion of one of the bottom overlay surface and the bottom underlay surface.

In one exemplary embodiment, a shingle includes a substrate having a top surface and a bottom surface, a foam, an asphalt layer, and a layer of granules. The asphalt layer covers at least a portion of the top surface and the layer of granules is adhered to the asphalt layer. The foam is applied to the substrate and covers at least a portion of the bottom surface.

BRIEF DESCRIPTION OF THE DRAWINGS

FIG. 1A is a side elevational view of an exemplary embodiment of a shingle;

FIG. 1B is a side elevational view of an exemplary embodiment of a laminated shingle;

FIG. 1C is a top perspective view of an exemplary embodiment of a laminated shingle;

FIG. 1D is a bottom perspective view of an exemplary embodiment of a laminated shingle;

FIG. 3 is a cross sectional view of a building having a roof that includes shingles according to an exemplary embodiment disclosed herein;

FIG. 4A is a side elevational view of an exemplary substrate with a foamable material applied thereto;

FIG. 4B is a side elevational view of an exemplary substrate with a foam applied thereto;

FIG. 4C is a side elevational view of an exemplary embodiment of a shingle;

FIG. 5A is a side elevational view of an exemplary substrate with a foamable material applied thereto;

FIG. 5B is a side elevational view of an exemplary substrate with a foam applied thereto;

FIG. 5C is a side elevational view of an exemplary embodiment of a shingle;

FIG. 6A is a side elevational view of an exemplary substrate with a foamable material applied thereto;

FIG. 6B is a side elevational view of an exemplary substrate with a foam applied thereto;

FIG. 6C is a side elevational view of an exemplary embodiment of a shingle;

FIG. 9A is a side elevational view of an exemplary embodiment of a shingle;

FIG. 9B is a side elevational view of an exemplary embodiment of a laminated shingle;

DETAILED DESCRIPTION

Figure 1E:
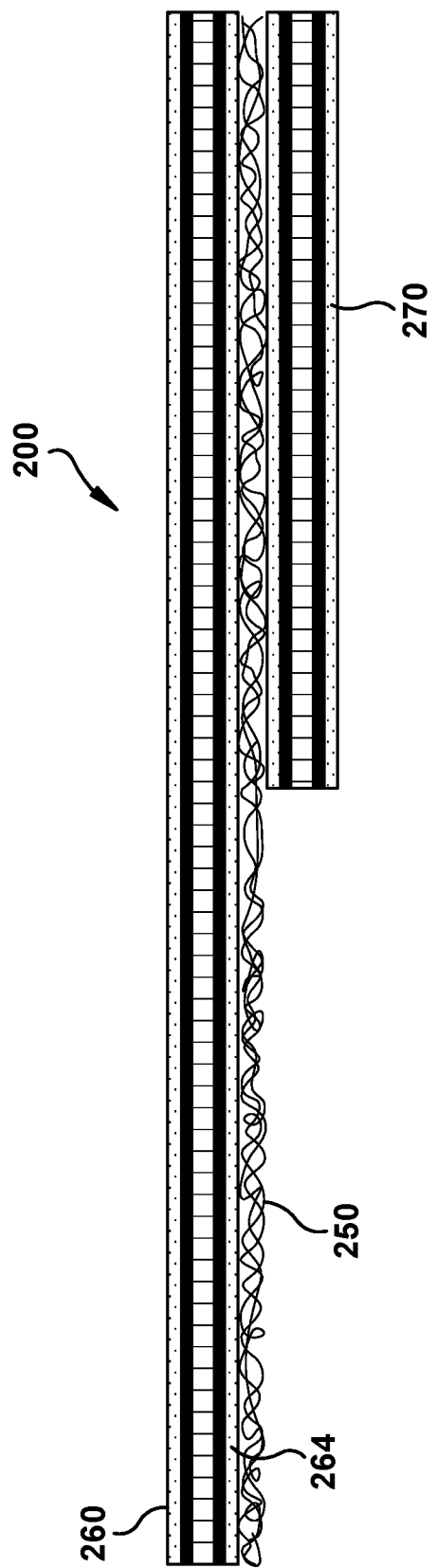
FIG. 1E is a side elevational view of an exemplary embodiment of a laminated shingle.

The present invention will now be described with occasional reference to the illustrated embodiments of the invention. This invention may, however, be embodied in different forms and should not be construed as limited to the embodiments set forth herein, nor in any order of preference. Rather, these embodiments are provided so that this disclosure will be more thorough, and will convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numerical values as used in the description and claims are to be understood as being modified in all instances by the term "about." Accordingly, unless otherwise indicated, the numerical values set forth in the description and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

As used in the description and the appended claims, the phrase "asphalt" refers to any type of bituminous material suitable for use on a roofing material, such as asphalts, tars, pitches, or mixtures thereof. The asphalt may be either manufactured asphalt produced by refining petroleum or naturally occurring asphalt. The asphalt may include various additives and/or modifiers, such as inorganic fillers or mineral stabilizers, organic materials such as polymers, recycled streams, ground tire rubber, carbon black, wax, and so forth. The asphalt may be subjected to an air blowing process, which is an oxidation process that involves blowing air through molten asphalt to modify the physical properties of the asphalt. In such an air blowing process, air is blown through the asphalt for a particular period of time at an elevated temperature.

In the exemplary embodiments described herein, the general inventive concepts are discussed with respect to roofing shingles. However, it should be understood that the general inventive concepts may also apply to any type of roofing material, such as, for example, asphalt-based roll roofing and commercial roofing.

Referring to FIG. 1A, an exemplary embodiment of a shingle 100 according to the present disclosure is illustrated. The shingle 100 includes a substrate 10 having a top surface 12 and a bottom surface 14 generally parallel to the top surface 12. The substrate 10 may be any material suitable for use in asphalt-based roofing materials. Exemplary materials suitable for use as the substrate 10 include, but are not limited to, a fiberglass mat, a scrim or felt of fibrous materials such as mineral fibers, cellulose fibers, rag fibers, polyester fibers, mixtures of mineral and synthetic fibers, or the like.

In certain exemplary embodiments, the substrate 10 comprises a non-woven web of glass fibers. The substrate 10 may be formed by a wet-laid process, as is known in the art. Generally, a wet-laid process involves adding glass fibers to a dispersant medium to form an aqueous slurry. Any suitable dispersant may be used. The dispersant, along with mechanical agitation, disperses the fibers sufficiently throughout the slurry. A continuous fine mesh screen passes through the fiber slurry such that the fibers are randomly deposited onto the screen to form a continuous non-woven web. Any excess liquid may be removed by vacuum or other suitable manner. The non-woven web is then saturated with a binder solution. Any suitable thermosetting or thermoplastic binder may be used, such as for example, traditional urea-formaldehyde binders, modified urea-formaldehyde binders, phenolic-formaldehyde binders, as well as the more recent formaldehyde-free binders, including polyacrylic binders and carbohydrate, starch, or bio-based binders. The binder-saturated web then passes through an oven that is heated to a suitable temperature to cure the binder and form the complete dry fiberglass substrate. In certain embodiments, the substrate 10 is a porous substrate. In the exemplary embodiments described herein, the substrate 10 is a fiberglass mat.

With continued reference to FIG. 1A, the shingle 100 includes a first asphalt layer 20 covering at least a portion of the top surface 12 of the substrate 10. Generally, the first asphalt layer 20 is formed by applying hot, melted asphalt to the substrate 10. The asphalt can be applied to the substrate 10 in any suitable manner. For example, the substrate 10 can be submerged in asphalt or the asphalt can be rolled on, sprayed on, or applied to the substrate 10 by other means. The asphalt may be any conventional asphalt used in roofing applications, and can be applied in any conventional manner and in any conventional amount or thickness.

In certain embodiments, the asphalt may be applied such that it impregnates the substrate 10 fully, partially, or not at all (i.e., the asphalt forms a discrete layer on a surface of the substrate 10). In this context, impregnation of the substrate 10 refers to filling the voids or spaces between the fibers in the substrate 10. For example, in the exemplary embodiments, the substrate 10 is a fiberglass mat. An uncoated, non-woven fiberglass mat is essentially a web of glass fibers held together by a cured binder, but the majority of the space taken up by the fiberglass mat is air. Fully impregnating the fiberglass mat means that all of the air space or substantially all of the air space, such as for example greater than 95% of the air space, between the glass fibers is filled, while partially impregnating the fiberglass mat means that some of the air space, such as for example less than 95% of the air space, between the glass fibers is filled.

In the exemplary embodiment shown in FIG. 1A, the asphalt fully impregnates the substrate 10 such that the shingle 100 includes a second asphalt layer 30 covering at least a portion of the bottom surface 14 of the substrate 10. In certain other embodiments, the first asphalt layer 20 and the second asphalt layer 30 are applied to the substrate 10 as discrete layers (i.e., no impregnation of the substrate 10), or are applied to the substrate 10 such that the substrate 10 is partially impregnated with asphalt.

The exemplary shingle 100 shown in FIG. 1A includes a layer of granules 40 that covers and is adhered to the first asphalt layer 20. Generally, the granules are deposited onto the first asphalt layer 20 after the first asphalt layer 20 is applied to the substrate 10. The substrate 10 may passed through rollers to embed the granules into the first asphalt layer 20. The layer of granules 40 may be configured to include a variety of materials, shapes, colors, and sizes. Any granules suitable for use on the top face of an asphalt-based roofing shingle may be used. For example, the granules may be ceramic-coated roofing granules. Further, a variety of different granules may be blended together, for example, to provide different color blends or to provide the appearance of varying thickness to the shingle 100.

With continued reference to FIG. 1A, the shingle 100 includes a spacing layer 50 attached beneath at least a portion of the bottom surface 14 of the substrate 10. The spacing layer 50 is configured to space the shingle 100, or a portion of the shingle 100, from a roof deck when the shingle 100 is applied to a roof. The spacing layer 50 can be configured in a wide variety of different ways, can take a wide variety of forms, and can be made from a wide variety of materials. For example, the spacing layer 50 may be configured and attached, either directly or indirectly, to the substrate 10 as a continuous layer or a discontinuous layer. The spacing layer 50 may take a wide variety of forms including, but not limited to, a matrix of convoluted filaments, strips of material, sheets of material, corrugated material, an inflatable cellular cushioning material (e.g., bubble film, bubble wrap), a mesh of material, and so forth. The spacing layer 50 may be made from a wide variety of materials including, but not limited to, bindered or unbindered glass fibers, various polymers, including various polymer fibers (e.g., polyester fibers, polyolefin fibers such as polyethylene fibers and polypropylene fibers, polyamide fibers) and various polymer foams (e.g., polyurethane foam, polystyrene foam, polyolefin foam, polyisocyanurate foam, acrylic foam), high density glass wool, mineral wool, perlite, fiberglass insulation, recycled materials, and combinations thereof.

The spacing layer 50 may have a constant thickness or a variable thickness (e.g., a tapered thickness). The thickness of the spacing layer 50 may be from about 0.05 inches to about 0.5 inches, including from about 0.1 inches to about 0.4 inches, from about 0.20 inches to about 0.3 inches, and also including from about 0.25 inches to about 0.35 inches. By attaching the spacing layer 50, the shingle 100 can be made thicker without increasing the amount of asphalt used to construct the shingle 100. Moreover, in certain embodiments, the spacing layer 50 can increase the thickness of the shingle 100 without substantially affecting the weight of the shingle 100.

In the embodiment of the shingle 100 illustrated in FIG. 1A, the spacing layer 50 comprises a matrix of convoluted filaments. The matrix of convoluted filaments can be made in the same general manner disclosed by U.S. Pat. No. 4,212,692, which is incorporated by reference herein in its entirety. The matrix of convoluted filaments can be made from a wide variety of different materials. Examples of suitable materials for the matrix of convoluted filaments include, but are not limited to, various polymers such as polyamides, polyolefins, polyesters, and so forth, a mixture of asphalt and a polymer, such as a mixture of 10-15% asphalt with polypropylene, polyester, polyurethane, and/or any recycled plastic. Any material capable of being formed into a matrix of convoluted filaments can be used.

The spacing layer 50 is attached, either directly or indirectly, beneath at least a portion of the bottom surface 14 of the substrate 10. In the embodiment illustrated in FIG. 1A, the spacing layer 50 comprises a matrix of convoluted filaments that is attached to the substrate 10 by pressing the matrix of convoluted filaments into the second asphalt layer 30, which functions as an adhesive. In other embodiments, the spacing layer 50, such as a matrix of convoluted filaments, a polymer foam, or corrugated polypropylene, can be attached directly to at least a portion of the bottom surface 14 of the substrate 10 using a suitable adhesive (e.g., an asphalt-based adhesive) or other suitable means for attaching the spacing layer 50 to the substrate 10.

In certain embodiments, the shingle 100 includes an optional layer of backdust particles adhered to the second asphalt layer 30. The optional backdust particles are generally deposited onto the second asphalt layer 30 after the asphalt is applied to the substrate. The shingles may be passed through rollers to further embed the backdust particles into the second asphalt layer 30. The backdust particles may comprise a variety of different materials, including but not limited to, Quartz ($SiO_2$), K-Feldspar ($KAlSi_3O_8$), Na-Feldspar ($NaAlSi_3O_8$), Dolomite ($CaMg(CO_3)_2$), pulverized sand, talc, mica, calcium carbonate, ground recycled glass, or other common inorganic material. The backdust particles may comprise a variety of different particle sizes. For example, the backdust particles may have an average particle size between about 20 and 1000 μm, 60 and 600 μm, 100 and 400 μm, or 100 and 300 μm. In certain embodiments, the backdust particles have an average particle size of about 200 μm. In certain embodiments, the spacing layer 50 is attached to the layer of backdust particles using a suitable adhesive or other suitable means. In other embodiments, the backdust particles are omitted and the spacing layer 50 is adhered directly to the second asphalt layer 30 or the substrate 10 (if the second asphalt layer 30 is also omitted).

Referring now to FIG. 1B, an exemplary embodiment of a laminated shingle 150 according to the present disclosure is illustrated. The laminated shingle 150 comprises an overlay sheet 60 attached to an underlay sheet 70 by, for example, an adhesive 80 or other suitable means. The overlay sheet 60 has a top overlay surface 62 and a bottom overlay surface 64. Similarly, the underlay sheet 70 has a top underlay surface 72 and a bottom underlay surface 74. As illustrated in FIG. 1B, a portion of the bottom overlay surface 64 is attached to a portion of the top underlay surface 72 by an adhesive 80. Similar to the shingle 100 illustrated in FIG. 1A, the overlay sheet 60 and the underlay sheet 70 generally comprise a substrate 10, a first asphalt layer 20 on the top surface of the substrate 10, a layer of granules 40 adhered to the first asphalt layer 20, a second asphalt layer 30 on the bottom surface of the substrate 10, and a layer of backdust particles 90 adhered to the second asphalt layer 30.

The laminated shingle 150 also includes a spacing layer 50 attached, either directly or indirectly, to at least a portion of one of the bottom overlay surface 64 and the bottom underlay surface 74. In certain embodiments, the spacing layer 50 is attached, either directly or indirectly, to a portion of both the bottom overlay surface 64 and the bottom underlay surface 74, as illustrated in FIG. 1B. The spacing layer 50 of the laminated shingle 150 may be any of the various exemplary spacing layers 50 previously described. In certain embodiments, the spacing layer 50 of the laminated shingle 150 comprises at least one of a matrix of convoluted filaments and a polymer foam. As with the shingle 100 of FIG. 1A, the spacing layer 50 of the laminated shingle 150 may be attached to the overlay sheet 60 and/or the underlay sheet 70 by a suitable adhesive (e.g., an asphalt-based adhesive) or other suitable means.

FIG. 1C illustrates another exemplary embodiment of a laminated shingle 150 according to the present disclosure. In the embodiment illustrated in FIG. 1C, the laminated shingle 150 includes an overlay sheet 60 attached to an underlay sheet 70. The overlay sheet 60 includes a headlap portion 61 and a tab portion 63. In the illustrated embodiment, the overlay sheet 60 includes cutouts 65 defining four tabs 67. Alternatively, any suitable number of cutouts 65 and tabs 67 may be formed in the overlay sheet 60.

The embodiment of the laminated shingle 150 shown in FIG. 1C has a spacing layer 50 (illustrated as a matrix of convoluted filaments) attached to the bottom underlay surface 74. The spacing layer 50 may be attached to the bottom underlay surface 74 in a wide variety of configurations. For example, in certain embodiments, the dimensions (e.g., perimeter, length, width, area) of the spacing layer 50 may be the same as the dimensions of the bottom underlay surface 74 such that the spacing layer 50 covers the bottom underlay surface 74. In other embodiments, the dimensions of the spacing layer 50 may be less than the dimensions of the bottom underlay surface 74, such that the spacing layer 50 covers only a portion of the bottom underlay surface 74, such as a strip of the spacing layer 50 that extends along the perimeter of the bottom underlay surface 74.

FIG. 1D illustrates another exemplary embodiment of a laminated shingle 150. In this embodiment, the laminated shingle 150 has a spacing layer 50 (illustrated as a matrix of convoluted filaments) attached to the bottom underlay surface 74 and to a portion of the bottom overlay surface 64. As seen in FIG. 1D, there is no spacing layer 50 where the overlay sheet 60 is attached to the underlay sheet 70, which is referred to as the common bond area 82.

Figure 1F:
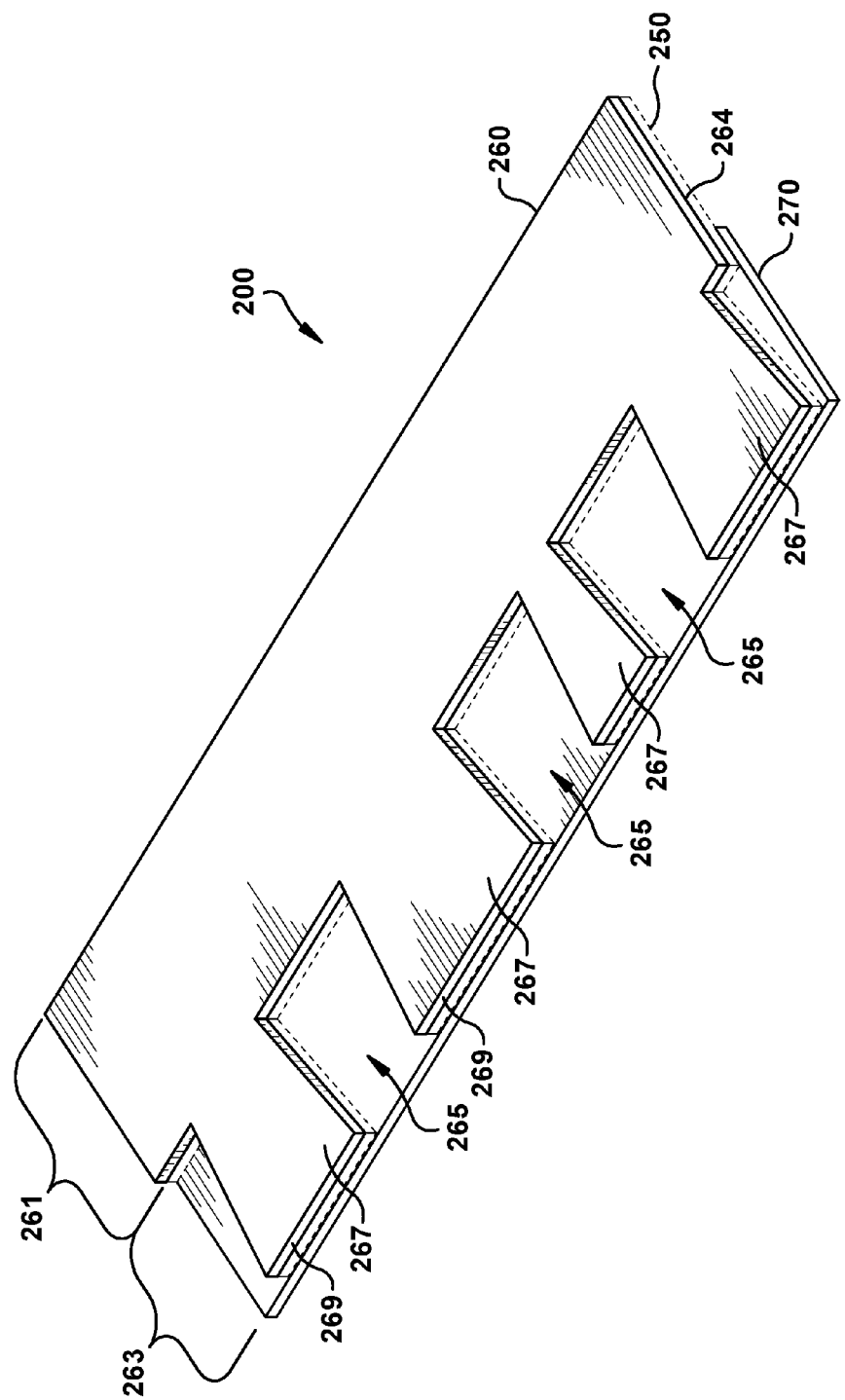
FIG. 1F is a top perspective view of the laminated shingle illustrated by FIG. 1E.
Figure 1G:
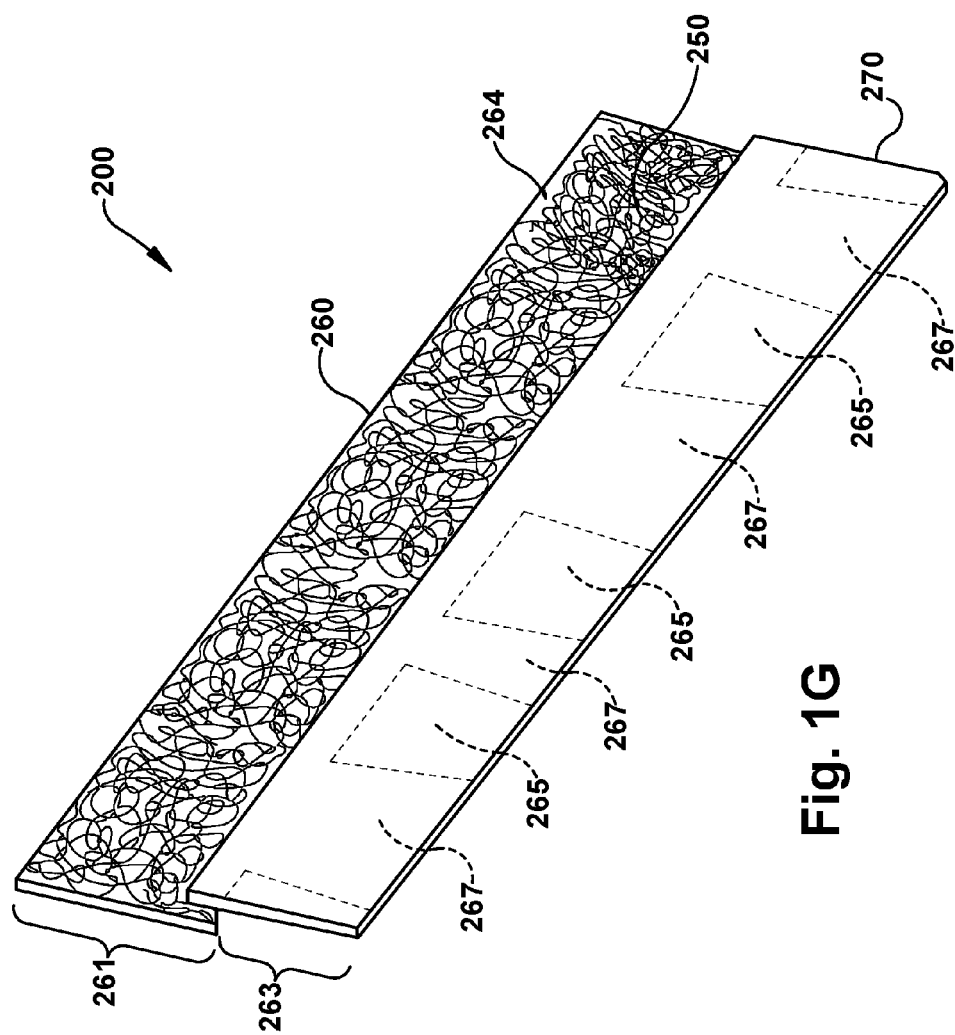
FIG. 1G is a bottom perspective view of the laminated shingle illustrated by FIG. 1E.

Referring now to FIGS. 1E, 1F, and 1G, another exemplary embodiment of a laminated shingle 200 according to the present disclosure is illustrated. The laminated shingle 200 includes an overlay sheet 260 attached to an underlay sheet 270. The overlay sheet 260 includes a headlap portion 261 and a tab portion 263. In the illustrated embodiment, the overlay sheet 260 includes cutouts 265 defining four tabs 267. Alternatively, any suitable number of cutouts 265 and tabs 267 may be formed in the overlay sheet 260. Edges of the tabs 267 define a leading edge 269 of the overlay sheet 260.

The embodiment of the laminated shingle 200 shown in FIGS. 1E, 1F, and 1G has a spacing layer 250 (illustrated as a matrix of convoluted filaments) attached to the bottom overlay surface 264. The spacing layer 250 may be attached to the bottom overlay surface 264 in a wide variety of configurations. For example, in certain embodiments, the dimensions (e.g., perimeter, length, width, area) of the spacing layer 250 may be the same as the dimensions of the bottom overlay surface 264 such that the spacing layer 250 covers the bottom overlay surface 264. In other embodiments, the dimensions of the spacing layer 250 may be less than the dimensions of the bottom overlay surface 264, such that the spacing layer 250 covers only a portion of the bottom overlay surface 264, such as a strip of the spacing layer 250 that extends along the perimeter of the bottom overlay surface 264.

In one embodiment, the laminated shingle includes tabs and the spacing layer is attached only to the portions of the bottom overlay surface that correspond to the tabs. In certain embodiments, the spacing layer attached to the portions of the bottom overlay surface that correspond to the tabs has a tapered thickness, with the thickest portion at the leading edge of the overlay sheet which tapers down as it approaches the headlap portion.

Figure 2:
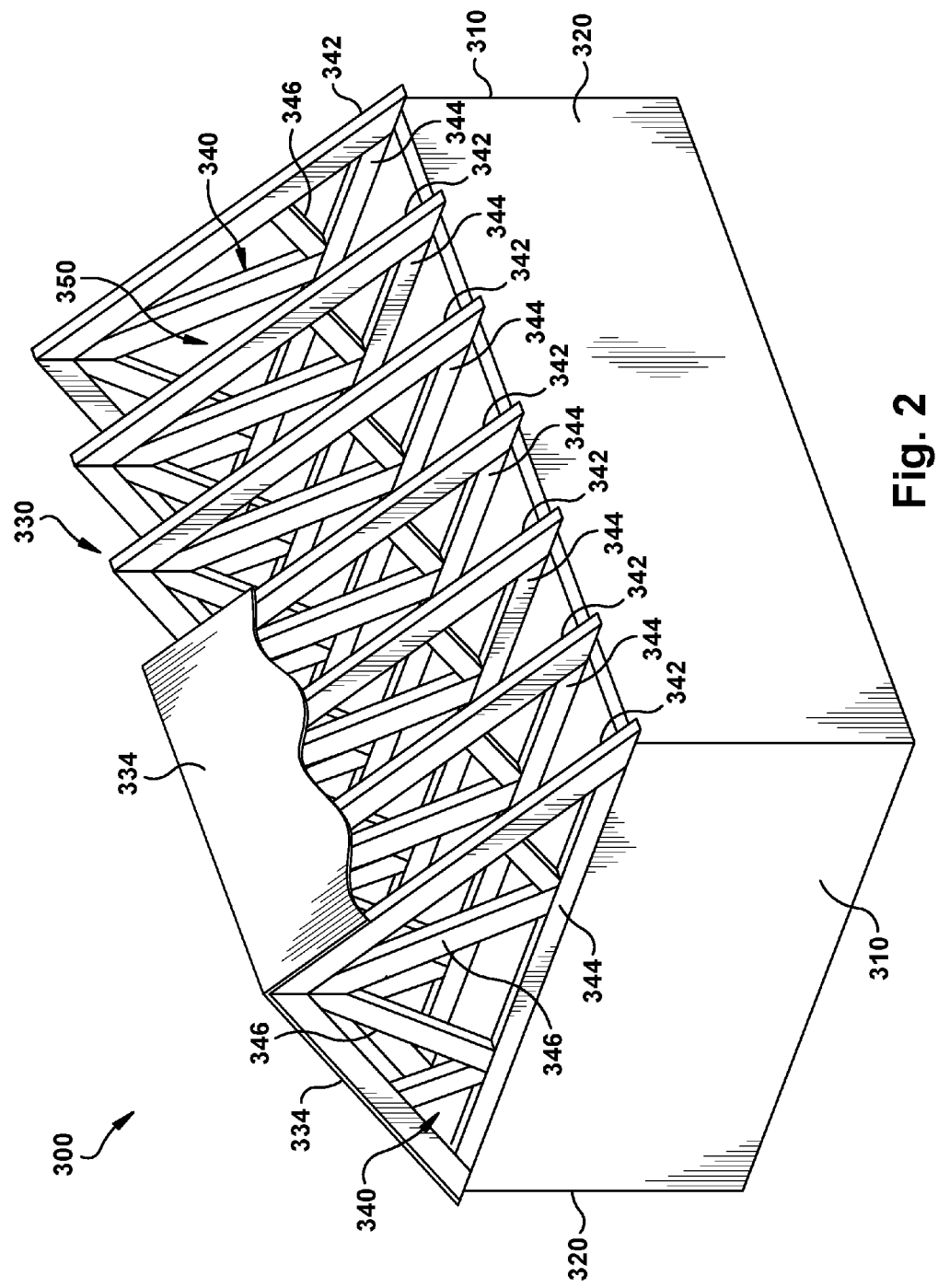
FIG. 2 is a perspective view of a building having a roof structure.

FIG. 2 illustrates a typical building 300 having end walls 310, side walls 320, and a roof structure 330 spanning the side walls 320. The roof structure 330 is formed by a series of spaced trusses 340 having top chords 342, a bottom chord 344, and web elements 346 arranged between the top chords 342 and the bottom chord 344. The roof structure 330 also includes a roof deck 334 attached to the trusses 340. An underlayment (not shown), such as roofing felt, is typically attached to the roof deck 334 prior to attaching roofing shingles. The roofing structure 330 covers the attic space 350 of the building 300, which can serve as a buffer to a conditioned, living space below the attic space 350. Typically, the temperature of the attic space 350 is maintained at or near the outside environmental air temperature through the use of ventilation with soffit vents and roof or ridge vents. Thermal insulation is often installed at the attic floor to reduce heat transfer between the attic space 350 and the living space of the building 300.

FIG. 3 illustrates a building 400 having a roof 410 comprising sloping roof planes 412 that intersect at a roof ridge 416. The roof planes 412 cover an attic space 450 of the building 400. The roof 410 also includes courses of shingles 460 attached to the roof planes 412 and a ridge vent 470 attached to the shingles 460 at the roof ridge 416. The attic space 450 shown in FIG. 3 is not ventilated, and instead of insulation being installed at the attic floor, the insulation is installed directly beneath the roof deck. Such an arrangement may be referred to as a closed envelope attic or an unvented attic.

As seen in FIG. 3, the shingles 460 have a spacing layer 480 attached to a bottom surface of the shingle substrate. In the embodiment shown in FIG. 3, the spacing layer 480 comprises a matrix of convoluted filaments. The matrix of convoluted filaments has a substantially open structure, such as greater than a 50% open structure, greater than an 80% open structure, greater than a 90% open structure, or even greater than a 95% open structure. The open structure of the matrix of convoluted filaments allows air to flow through the matrix of convoluted filaments under the shingles 460 and to flow out through the ridge vent 470, as illustrated by the directional arrows. Thus, the matrix of convoluted filaments provides a ventilation space running from the eve edge 490 to the roof ridge 416, which allows incidental moisture to be drained away and to also allow evaporative drying. The substantially open structure of the matrix of convoluted filaments also facilitates drying of condensed water vapor from the building interior. Furthermore, the matrix of convoluted filaments promotes a reduction in thermal heat gain by the roof 410 due to the spacing of the shingle 460 from the roof deck. In addition, the air flow through the matrix of convoluted filaments and beneath the shingles 460 helps cool the shingles 460, which helps prevent the asphalt layer from flowing at elevated temperatures.

Although the exemplary embodiment of shingles 460 illustrated in FIG. 3 has a spacing layer 480 comprising a matrix of convoluted filaments, the spacing layer 480 may be configured in other ways such that the spacing layer 480 provides an open structure or open channels that allow air to flow therethrough. As one particular example, the spacing layer 480 can comprise a corrugated plastic or foam, such as a corrugated polypropylene.

Referring now to FIGS. 4A, 4B, and 4C, an exemplary embodiment of a shingle 500 according to the present disclosure is illustrated. The shingle 500 includes a substrate 510 having a top surface 512 and a bottom surface 514 generally parallel to the top surface 512. The substrate 510 may be any of the previously described materials suitable for use in asphalt-based roofing materials. Preferably, the substrate 510 is a fiberglass mat.

As shown in FIG. 4A, a foamable material 530 is applied to the substrate 510. The foamable material 530 can be applied to the substrate 510 in any suitable manner. For example, the substrate 510 can be submerged in the foamable material 530 or the foamable material 530 can be rolled on, sprayed on, or applied to the substrate 510 by other means. The foamable material 530 may comprise a wide variety of materials including, but not limited to, various polymers, copolymers, resins, blowing agents, cross-linking agents, curing agents, catalysts, extenders, flame retardants, fillers, and other additives. A wide variety of polymers and copolymers may be used in the foamable material 530. Examples of suitable polymers and copolymers include, but are not limited to, polyolefins (e.g., polyethylene, polypropylene), polystyrene, polyurethanes, polyvinylchloride, polyisocyanurates, poly(acrylic acid), polyesters, ethylene-vinyl acetate (EVA) copolymer, and styrene-butadiene-styrene (SBS) copolymer. In certain embodiments, the foamable material 530 may comprise a flame retardant material including, but not limited to, expandable graphite and ammonium polyphosphate, as described in U.S. Patent Application Publication No. 2014/0272244 A1, which is incorporated by reference herein in its entirety.

In certain embodiments, the foamable material 530 comprises materials capable of forming at least one of a polyolefin foam (e.g., polyethylene foam, polypropylene foam), a polyurethane foam, a polystyrene foam, a polyisocyanurate foam, and a polymer modified asphalt foam (e.g., styrene-butadiene-styrene (SBS) and sulfur modified asphalt foam, Elvaloy® polymer and copolymer (from DuPont) modified asphalt foams). The foamable material 530 may form a foam 550 by chemical blowing, mechanical agitation, temperature and/or pressure changes, ultraviolet radiation, or other means known in the art. In certain embodiments, the foamable material 530 may include asphalt as an extender and carbon black. For example, in certain embodiments, the foamable material 530 may include from about 75 wt. % to 89 wt. % of one or more polymers, from about 10 wt. % to about 20 wt. % of asphalt, and up to about 1 wt. % carbon black. The asphalt extender can reduce the amount of polymer used and can also improve bonding between the foam 550 and asphalt layer 520.

FIG. 4B illustrates the substrate 510 with a foam 550 applied thereto. In certain embodiments, the foam 550 may be applied such that it impregnates the substrate 510 fully, partially, or not at all (i.e., the foam 550 forms a discrete layer on a surface of the substrate 510). As seen in the embodiment of FIG. 4B, the substrate 510 is at least partially impregnated with the foam 550 and the foam 550 covers at least a portion of the bottom surface 514 of the substrate 510 and at least a portion of the top surface 512 of the substrate 510.

As seen in FIG. 4C, the shingle 500 includes an asphalt layer 520 covering at least a portion of the top surface 512 of the substrate 510. Generally, the asphalt layer 520 is formed by applying hot, melted asphalt to the substrate 510. The asphalt can be applied to the substrate 510 in any suitable manner. For example, the substrate 510 can be submerged in asphalt or the asphalt can be rolled on, sprayed on, or applied to the substrate 510 by other means. The asphalt may be any conventional asphalt used in roofing applications, and can be applied in any conventional manner and in any conventional amount or thickness. As seen in the embodiment of FIG. 4C, the substrate 510 is at least partially impregnated with asphalt from the asphalt layer 520, and asphalt from the asphalt layer 520 covers the foam 550 on the top surface 512 of the substrate 510. In embodiments where the foam 550 fully impregnates the substrate 510, the asphalt is inhibited from impregnating the substrate 510 and the asphalt covers the foam 550 on the top surface 512 of the substrate 510 so as to form a discrete asphalt layer 520 on top of the foam 550.

The exemplary shingle 500 shown in FIG. 4C also includes a layer of granules 540 that covers and is adhered to the asphalt layer 520. Generally, the granules are deposited onto the asphalt layer 520 after the asphalt layer 520 is applied to the substrate 510. The substrate 510 may passed through rollers to embed the granules into the asphalt layer 520. The layer of granules 540 may be configured to include a variety of materials, shapes, colors, and sizes. Any granules suitable for use on the top surface of an asphalt-based roofing shingle may be used. For example, the granules may be ceramic-coated roofing granules. Further, a variety of different granules may be blended together, for example, to provide different color blends or to provide the appearance of varying thickness to the shingle 500.

Applying a foam 550 to the substrate 510 of the shingle 500 can provide a number of advantages. For example, the foam 550 can increase the thickness of the shingle 500 without using more asphalt to increase the thickness. In fact, the foam 550 can increase the thickness of the shingle 500 by using less asphalt than conventional shingles since only a discrete asphalt layer on the top surface 512 of the substrate 500 (or foam 550) may be needed. Furthermore, the foam 550 can increase the thickness of the shingle 500 while at the same time reduce the weight of the shingle 500 due to a reduction in the amount of asphalt used. A foam 550 applied to and covering at least a portion of the bottom surface 514 of the substrate 510 may eliminate the need for a layer of backdust particles, which is typically applied to improve handling of the shingles and to prevent shingles from sticking to adjacent shingles when packaged. In addition, the foam 550 may be configured to improve one or more properties of the shingle 500. For example, the foam 550 may improve properties of the shingle 500 including, but not limited to, tensile strength, tear resistance, shingle stiffness, wind resistance, fire/burn resistance, cold curling resistance, masking ability (i.e., the ability of the shingle to mask imperfections in the roofing deck), and impact resistance. The foam 550 may also seal the substrate 510 to effectively prevent water intrusion into the substrate 510. In addition, the foam 550 may also help prevent flow of the asphalt layer at elevated temperatures.

The foam 550 may be a closed-cell foam or an open-cell foam. The foam 550 may be capable of holding its cell structure over the life of the shingle 500. Preferably, the foam 550 has sufficient recovery and flexibility to recover a minimum of 50% of its original thickness after compression, particularly prolonged compression (e.g., compression due to packaging and storing the shingles in stacks on pallets), and after experiencing elevated temperatures on the roof. In certain embodiments, the recovery exhibited by shingles 500 comprising foam 550 is uniform from shingle to shingle. The foam 550 is preferably able to withstand elevated temperatures, such as a conventional temperature range of melted asphalt used in shingle making processes, which may range from about 365° F. to about 450° F., including from about 375° F. to about 450° F., and also including from 400° F. to 450° F.

Referring now to FIGS. 5A, 5B, and 5C, another exemplary embodiment of a shingle 600 according to the present disclosure is illustrated. The shingle 600 includes a substrate 610 having a top surface 612 and a bottom surface 614 generally parallel to the top surface 612. The substrate 610 may be any of the previously described materials suitable for use in asphalt-based roofing materials. As seen in FIG. 5A, a foamable material 630 is applied to the substrate 610, primarily at the bottom surface 614 of the substrate 610. FIG. 5B illustrates the substrate 610 with the foam 650 applied thereto. In the embodiment of FIG. 5B, the substrate 610 is at least partially impregnated with the foam 650 and the foam 650 covers at least a portion of the bottom surface 614 of the substrate 610 and the foam 650 does not cover any portion of the top surface 612 of the substrate 610. The foam 650 may be any of the previously described embodiments of foam.

As seen in FIG. 5C, the shingle 600 includes an asphalt layer 620 covering at least a portion of the top surface 612 of the substrate 610. The asphalt layer 620 of the shingle 600 may be formed as previously described. The asphalt may be any conventional asphalt used in roofing applications, and can be applied in any conventional manner and in any conventional amount or thickness. In the embodiment illustrate in FIG. 5C, the substrate 610 is at least partially impregnated with asphalt from the asphalt layer 620 at the top surface 612 of the substrate 610. The exemplary shingle 600 shown in FIG. 5C also includes a layer of granules 640 that covers and is adhered to the asphalt layer 620. The layer of granules 640 may be applied as previously described. Any granules suitable for use on the top surface of an asphalt-based roofing shingle may be used.

Referring now to FIGS. 6A, 6B, and 6C, another exemplary embodiment of a shingle 700 according to the present disclosure is illustrated. The shingle 700 includes a substrate 610 having a top surface 712 and a bottom surface 714 generally parallel to the top surface 712. The substrate 710 may be any of the previously described materials suitable for use in asphalt-based roofing materials. As seen in FIG. 6A, a foamable material 730 is applied to the substrate 710, primarily at the bottom surface 714 of the substrate 710. FIG. 6B illustrates the substrate 710 with the foam 750 applied thereto. In the embodiment of FIG. 6B, the substrate 710 is at least partially impregnated with the foam 750 and the foam 750 covers at least a portion of the bottom surface 714 of the substrate 710 and the foam 750 does not cover any portion of the top surface 712 of the substrate 710. The foam 750 may be any of the previously described embodiments of foam. In FIG. 6C, the embodiment of the shingle 700 has a discrete layer of foam 750 applied to the bottom surface 714 of the substrate 710 with minimal to no impregnation of the substrate 710.

As seen in FIG. 6C, the shingle 700 includes an asphalt layer 720 covering at least a portion of the top surface 712 of the substrate 710. The asphalt layer 720 of the shingle 700 may be formed as previously described. The asphalt may be any conventional asphalt used in roofing applications, and can be applied in any conventional manner and in any conventional amount or thickness. In the embodiment illustrated in FIG. 6C, the substrate 710 is at least partially impregnated with asphalt from the asphalt layer 720 at the top surface 712 of the substrate 710. The exemplary shingle 700 shown in FIG. 6C also includes a layer of granules 740 that covers and is adhered to the asphalt layer 720. The layer of granules 740 may be applied as previously described. Any granules suitable for use on the top surface of an asphalt-based roofing shingle may be used.

Figure 7A:
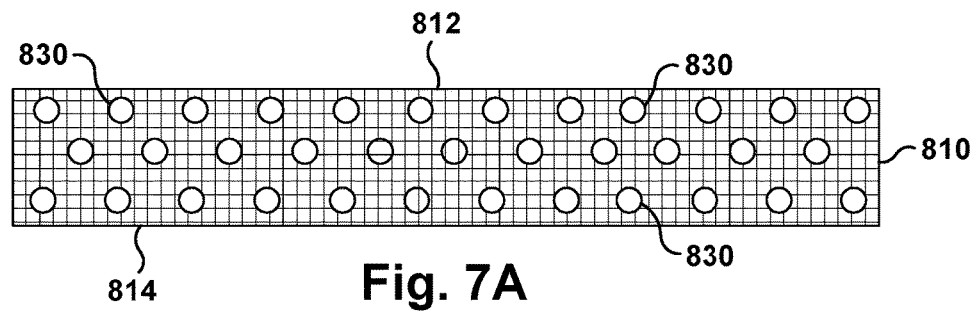
FIG. 7A is a side elevational view of an exemplary substrate with a foamable material applied thereto.
Figure 7B:
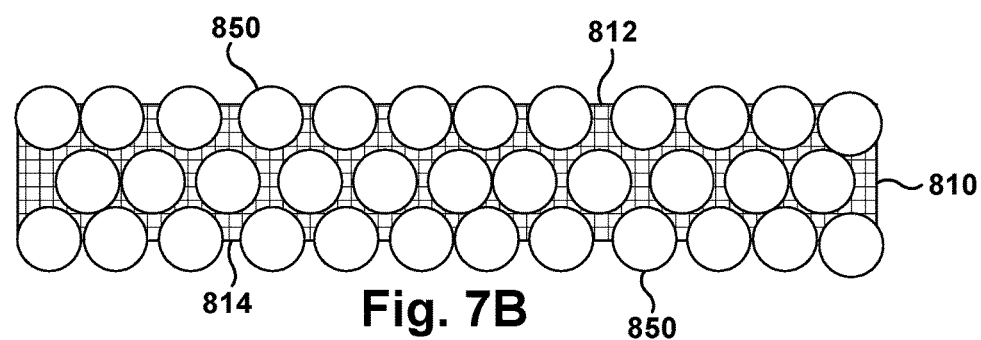
FIG. 7B is a side elevational view of an exemplary substrate with a foam applied thereto.

With reference now to FIGS. 7A, 7B, 7C, and 7D, an exemplary embodiment of a shingle 800 according to the present disclosure is illustrated. Similar to the embodiment illustrated in FIGS. 4A, 4B, and 4C, the embodiment of the shingle 800 shown in FIGS. 7A, 7B, 7C, and 7D includes a substrate 810 having a top surface 812 and a bottom surface 814 generally parallel to the top surface 812. The substrate 810 may be any of the previously described materials suitable for use in asphalt-based roofing materials. As seen in FIG. 7A, a foamable material 830 is applied to the substrate 810. FIG. 7B illustrates the substrate 810 with the foam 850 applied thereto. In the embodiment of FIG. 7B, the substrate 810 is at least partially impregnated with the foam 850 and the foam 850 covers at least a portion of the bottom surface 814 of the substrate 810 and at least a portion of the top surface 812 of the substrate 810. The foam 850 may be any of the previously described embodiments of foam.

Figure 7C:
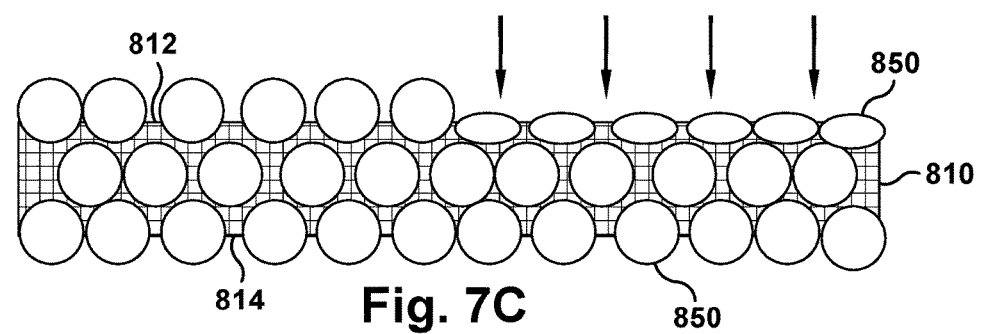
FIG. 7C is a side elevational view of an exemplary substrate with a foam applied thereto with a portion of the foam collapsed.

As shown in FIG. 7C, a portion of the foam 850 at the top surface 812 of the substrate 810 is collapsed. In this context, the term "collapsed" means that the height or thickness of the foam 850 is reduced. The collapsing of the foam 850 at the top surface 812 of the substrate 810 may be accomplished by the application of pressure (as illustrated by the directional arrows of FIG. 7C), cutting, or other suitable means. By collapsing a portion of the foam 850 at the top surface 812 of the substrate 810, the resulting shingle 800, seen in FIG. 7D, may have the look of a conventional laminated shingle. In addition, the shingle 800 shown in FIG. 7D may be produced using much less raw material since the shingle 800 will not have an overlay sheet laminated to an underlay sheet as used in conventional laminated shingles.

Figure 7D:
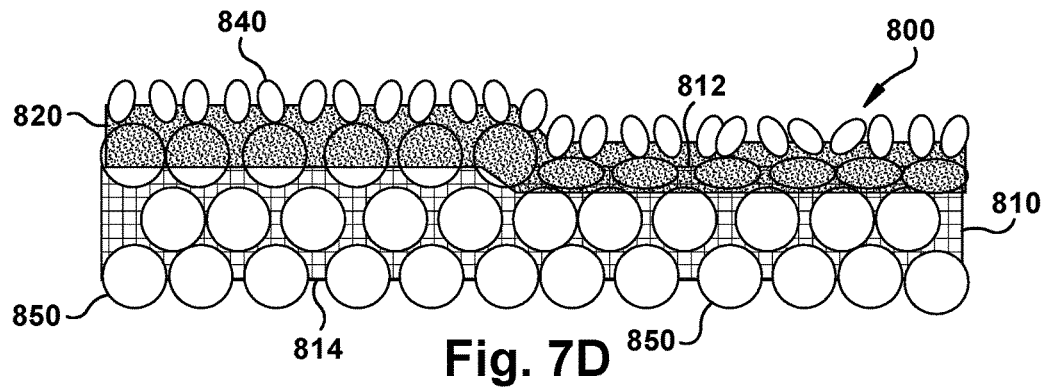
FIG. 7D is a side elevational view of an exemplary embodiment of a shingle.

As seen in FIG. 7D, the shingle 800 includes an asphalt layer 820 covering at least a portion of the top surface 812 of the substrate 810. The asphalt layer 820 of the shingle 800 may be formed as previously described. The asphalt may be any conventional asphalt used in roofing applications, and can be applied in any conventional manner and in any conventional amount or thickness. In the embodiment illustrated in FIG. 7D, the substrate 810 is at least partially impregnated with asphalt from the asphalt layer 820 at the top surface 812 of the substrate 810. The exemplary shingle 800 shown in FIG. 7D also includes a layer of granules 840 that covers and is adhered to the asphalt layer 820. The layer of granules 840 may be applied as previously described. Any granules suitable for use on the top surface of an asphalt-based roofing shingle may be used.

Figure 8A:
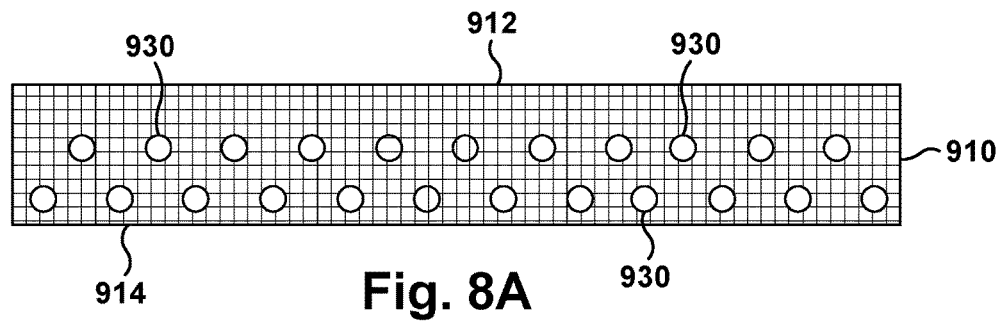
FIG. 8A is a side elevational view of an exemplary substrate with a foamable material applied thereto.
Figure 8B:
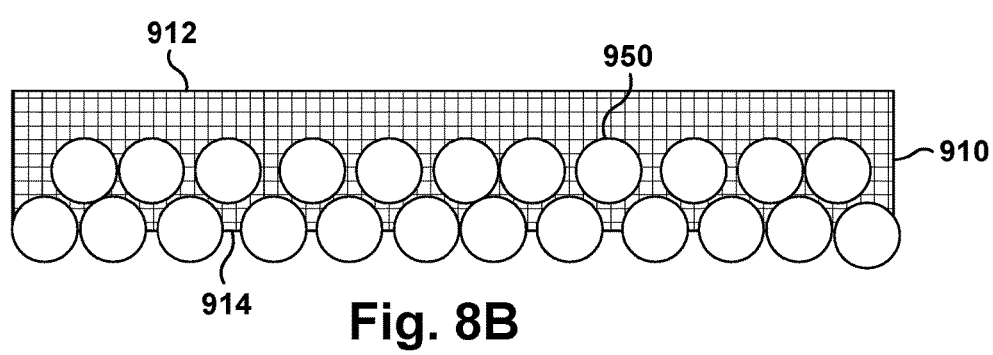
FIG. 8B is a side elevational view of an exemplary substrate with a foam applied thereto.

With reference now to FIGS. 8A, 8B, 8C, and 8D, another exemplary embodiment of a shingle 900 according to the present disclosure is illustrated. Similar to the embodiment illustrated in FIGS. 5A, 5B, and 5C, the embodiment of the shingle 900 shown in FIGS. 8A, 8B, 8C, and 8D includes a substrate 910 having a top surface 912 and a bottom surface 914 generally parallel to the top surface 912. The substrate 910 may be any of the previously described materials suitable for use in asphalt-based roofing materials. As seen in FIG. 8A, a foamable material 930 is applied to the substrate 910, primarily at the bottom surface 914 of the substrate 910. FIG. 8B illustrates the substrate 910 with the foam 950 applied thereto. In the embodiment of FIG. 8B, the substrate 910 is at least partially impregnated with the foam 950 and the foam 950 covers at least a portion of the bottom surface 914 of the substrate 910 and does not cover the top surface 912 of the substrate 910. The foam 950 may be any of the previously described embodiments of foam.

Figure 8C:
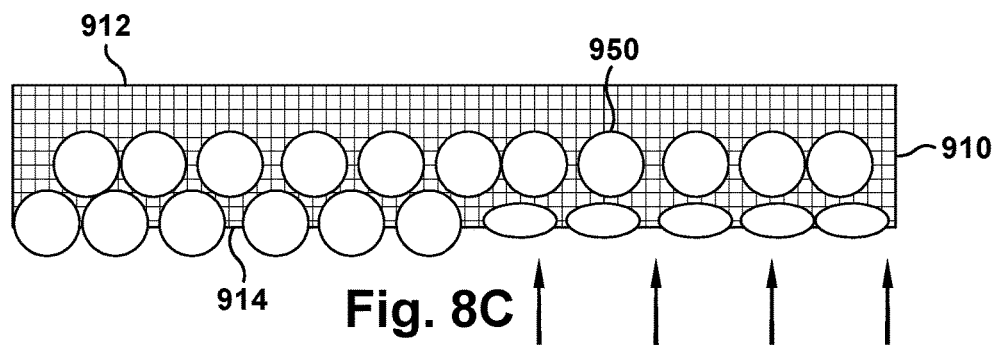
FIG. 8C is a side elevational view of an exemplary substrate with a foam applied thereto with a portion of the foam collapsed.
Figure 8D:
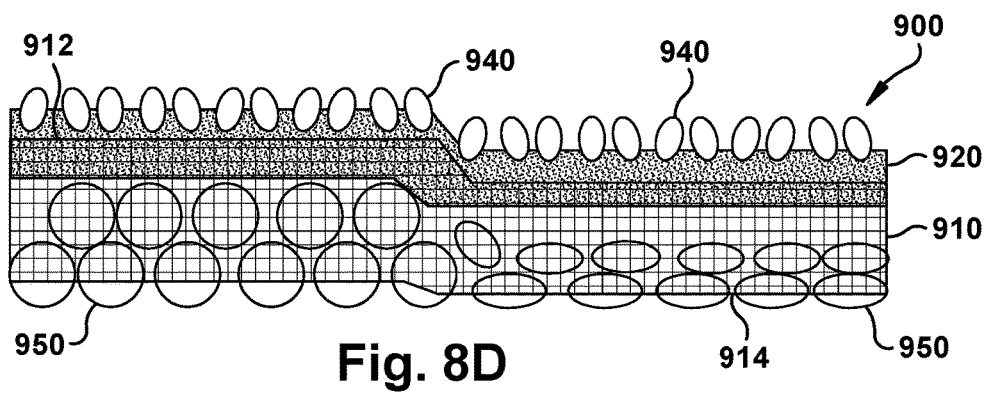
FIG. 8D is a side elevational view of an exemplary embodiment of a shingle.

As shown in FIG. 8C, a portion of the foam 950 at the bottom surface 914 of the substrate 910 is collapsed. As previously mentioned, the collapsing of the foam 950 may be accomplished by the application of pressure (as illustrated by the directional arrows in FIG. 8C), cutting, or other suitable means. By collapsing a portion of the foam 950 at the bottom surface 914 of the substrate 910, the resulting shingle 900, seen in FIG. 8D, may have the look of a conventional laminated shingle. As seen in FIG. 8D, the shingle 900 includes an asphalt layer 920 covering at least a portion of the top surface 912 of the substrate 910. The asphalt layer 920 of the shingle 900 may be formed as previously described. The asphalt may be any conventional asphalt used in roofing applications, and can be applied in any conventional manner and in any conventional amount or thickness. In the embodiment illustrated in FIG. 8D, the substrate 910 is at least partially impregnated with asphalt from the asphalt layer 920 at the top surface 912 of the substrate 910. The exemplary shingle 900 shown in FIG. 8D also includes a layer of granules 940 that covers and is adhered to the asphalt layer 920. The layer of granules 940 may be applied as previously described. Any granules suitable for use on the top surface of an asphalt-based roofing shingle may be used.

In certain embodiments, instead of selectively collapsing the foam at a surface of the substrate, the foamable material applied to the substrate may be selectively foamed or swelled. In other words, in certain embodiments, the foamable material may be foamed or swelled at selected positions on the substrate such that a top surface or bottom surface of the substrate has a variable thickness.

Referring now to FIG. 9A, another exemplary embodiment of a shingle 1000 according to the present disclosure is illustrated. The shingle 1000 shown in FIG. 9A includes a substrate 1010 having a top surface 1012 and a bottom surface 1014 generally parallel to the top surface 1012. The substrate 1010 may be any of the previously described materials suitable for use in asphalt-based roofing materials such as, for example, a non-woven web of glass fibers. The shingle 1000 includes a first asphalt layer 1020 covering at least a portion of the top surface 1012 of the substrate 1010 and a second asphalt layer 1030 covering at least a portion of the bottom surface 1014 of the substrate 1010. As previously discussed, the asphalt may be applied such that it impregnates the substrate 1010 fully, partially, or not at all (i.e., the asphalt forms a discrete layer on a surface of the substrate 1010). The asphalt may be any conventional asphalt used in roofing applications, and can be applied in any conventional manner and in any conventional amount or thickness. It is also contemplated that the shingle 1000 may have a single asphalt layer (e.g., the first asphalt layer 1020) that covers at least a portion of either the top surface 1012 or the bottom surface 1014 of the substrate 1010.

The exemplary shingle 1000 shown in FIG. 9A includes a layer of granules 1040 that covers and is adhered to the first asphalt layer 1020. The granules may be deposited onto the first asphalt layer 1020 as previously described.

In the embodiment shown in FIG. 9A, the shingle includes a spacing layer 1050 in the form of a layer of foam material, which is applied to the substrate 1010 such that it covers at least a portion of the second asphalt layer 1030. The foam spacing layer 1050 may be any preformed foam material, such as the foam materials previously described herein, including various polymer foams. The foam spacing layer 1050 is configured to space the shingle 1000, or a portion of the shingle 1000, from a roof deck when the shingle 1000 is applied to a roof. The foam spacing layer 1050 may be configured and attached, either directly or indirectly, to the substrate 1010 as a continuous layer or a discontinuous layer.

The foam spacing layer 1050 may have a constant thickness or a variable thickness (e.g., a tapered thickness). The thickness of the foam spacing layer 1050 may be from about 0.05 inches to about 0.5 inches, including from about 0.1 inches to about 0.4 inches, from about 0.20 inches to about 0.3 inches, and also including from about 0.25 inches to about 0.35 inches. By attaching the foam spacing layer 1050, the shingle 1000 can be made thicker without increasing the amount of asphalt used to construct the shingle 1000. Moreover, in certain embodiments, the foam spacing layer 1050 can increase the thickness of the shingle 1000 without substantially affecting the weight of the shingle 1000.

The foam spacing layer 1050 is attached, either directly or indirectly, beneath at least a portion of the bottom surface 1014 of the substrate 1010. In the embodiment illustrated in FIG. 9A, the foam spacing layer 1050 is attached to the substrate 1010 by pressing the foam into the second asphalt layer 30, which functions as an adhesive. In other embodiments, the foam spacing layer 1050 can be attached directly to at least a portion of the bottom surface 1014 of the substrate 1010 using a suitable adhesive (e.g., an asphalt-based adhesive) or other suitable means for attaching the foam spacing layer 1050 to the substrate 1010.

In certain embodiments, the shingle 1000 may include an optional layer of backdust particles adhered to the second asphalt layer 1030. The optional backdust particles are generally deposited onto the second asphalt layer 1030 after the asphalt is applied to the substrate. The shingles may be passed through rollers to further embed the backdust particles into the second asphalt layer 1030. The backdust particles may comprise a variety of different materials, including but not limited to, Quartz ($SiO_2$), K-Feldspar ($KAlSi_3O_8$), Na-Feldspar ($NaAlSi_3O_8$), Dolomite ($CaMg(CO_3)_2$), pulverized sand, talc, mica, calcium carbonate, ground recycled glass, or other common inorganic material. The backdust particles may comprise a variety of different particle sizes. For example, the backdust particles may have an average particle size between about 20 and 1000 µm, 60 and 600 µm, 100 and 400 µm, or 100 and 300 µm. In certain embodiments, the backdust particles have an average particle size of about 200 µm. In certain embodiments, the foam spacing layer 1050 is attached to the layer of backdust particles using a suitable adhesive or other suitable means. In other embodiments, the backdust particles are omitted and the foam spacing layer 1050 is adhered directly to the second asphalt layer 1030 or to the substrate 1010 (if the second asphalt layer 1030 is also omitted).

Referring now to FIG. 9B, an exemplary embodiment of a laminated shingle 1150 according to the present disclosure is illustrated. The laminated shingle 1150 comprises an overlay sheet 1060 attached to an underlay sheet 1070 by, for example, an adhesive 1080 or other suitable means. The overlay sheet 1060 has a top overlay surface 1062 and a bottom overlay surface 1064. Similarly, the underlay sheet 1070 has a top underlay surface 1072 and a bottom underlay surface 1074. As illustrated in FIG. 9B, a portion of the bottom overlay surface 1064 is attached to a portion of the top underlay surface 1072 by an adhesive 1080. Similar to the shingle 1000 illustrated in FIG. 9A, the overlay sheet 1060 and the underlay sheet 1070 may comprise a substrate 1010, a first asphalt layer 1020 on the top surface of the substrate 1010, a layer of granules 1040 adhered to the first asphalt layer 1020, a second asphalt layer 1030 on the bottom surface of the substrate 1010, and a layer of backdust particles 1090 adhered to the second asphalt layer 1030.

The laminated shingle 1150 includes a foam spacing layer 1050 attached, either directly or indirectly, to at least a portion of one of the bottom overlay surface 1064 and the bottom underlay surface 1074. In certain embodiments, the foam spacing layer 1050 is attached, either directly or indirectly, to a portion of both the bottom overlay surface 1064 and the bottom underlay surface 1074, as illustrated in FIG. 9B. As with the shingle 1000 of FIG. 9A, the foam spacing layer 1050 of the laminated shingle 1150 may be attached to the overlay sheet 1060 and/or the underlay sheet 1070 by a suitable adhesive (e.g., an asphalt-based adhesive) or other suitable means.

Figure 9C:
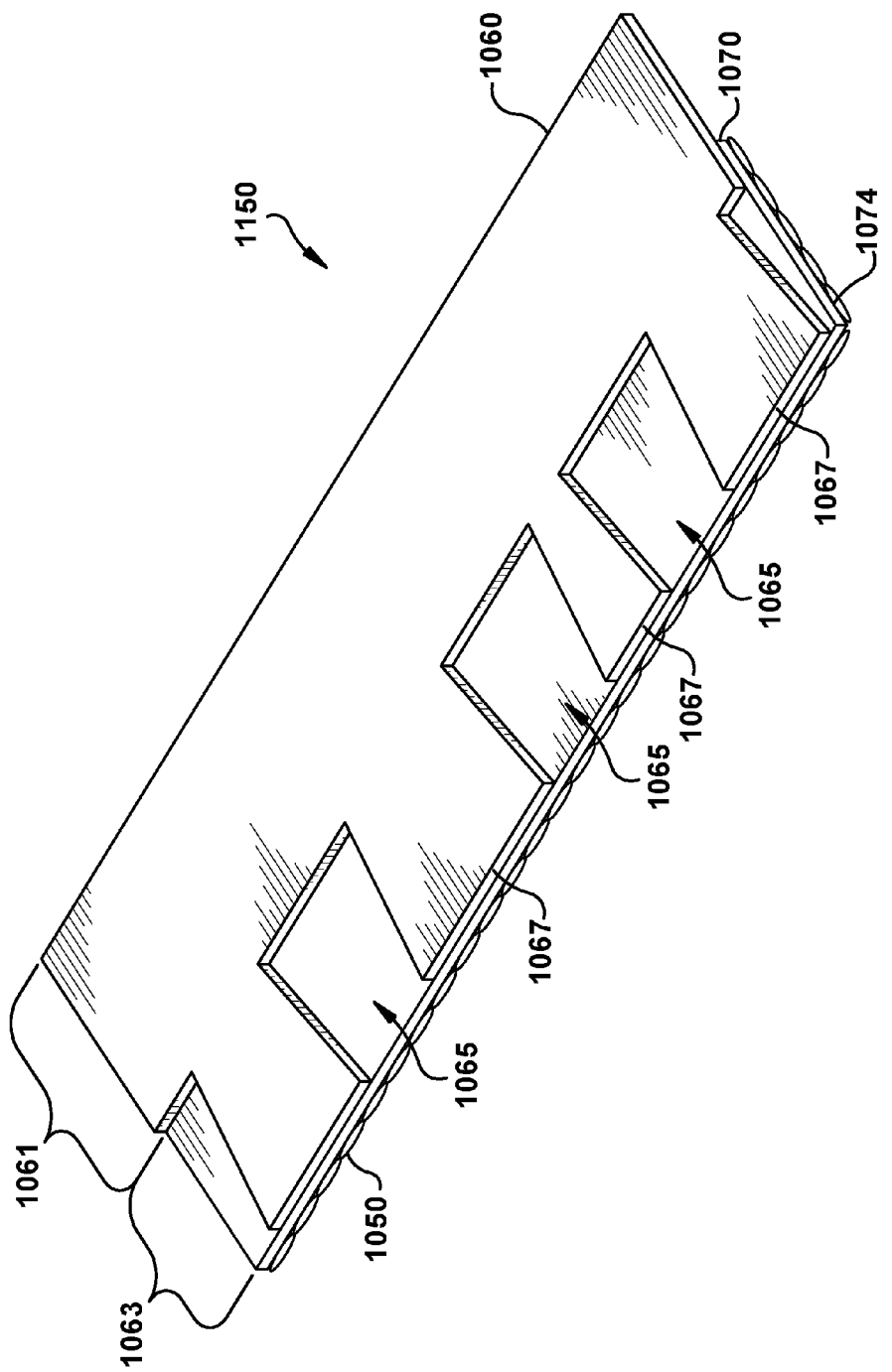
FIG. 9C is a top perspective view of an exemplary embodiment of a laminated shingle.

FIG. 9C illustrates another exemplary embodiment of a laminated shingle 1150 according to the present disclosure.

In the embodiment illustrated in FIG. 9C, the laminated shingle 1150 includes an overlay sheet 1060 attached to an underlay sheet 1070. The overlay sheet 1060 includes a headlap portion 1061 and a tab portion 1063. In the illustrated embodiment, the overlay sheet 1060 includes cutouts 1065 defining four tabs 1067. Alternatively, any suitable number of cutouts 1065 and tabs 1067 may be formed in the overlay sheet 1060.

The embodiment of the laminated shingle 1150 shown in FIG. 9C has a foam spacing layer 1050 attached to the bottom underlay surface 1074. The foam spacing layer 1050 may be attached to the bottom underlay surface 1074 in a wide variety of configurations. For example, in certain embodiments, the dimensions (e.g., perimeter, length, width, area) of the foam spacing layer 1050 may be the same as the dimensions of the bottom underlay surface 1074 such that the foam spacing layer 1050 covers the bottom underlay surface 1074. In other embodiments, the dimensions of the foam spacing layer 1050 may be less than the dimensions of the bottom underlay surface 1074, such that the foam spacing layer 1050 covers only a portion of the bottom underlay surface 1074, such as a strip of the foam spacing layer 1050 that extends along the perimeter of the bottom underlay surface 1074.

Figure 9D:
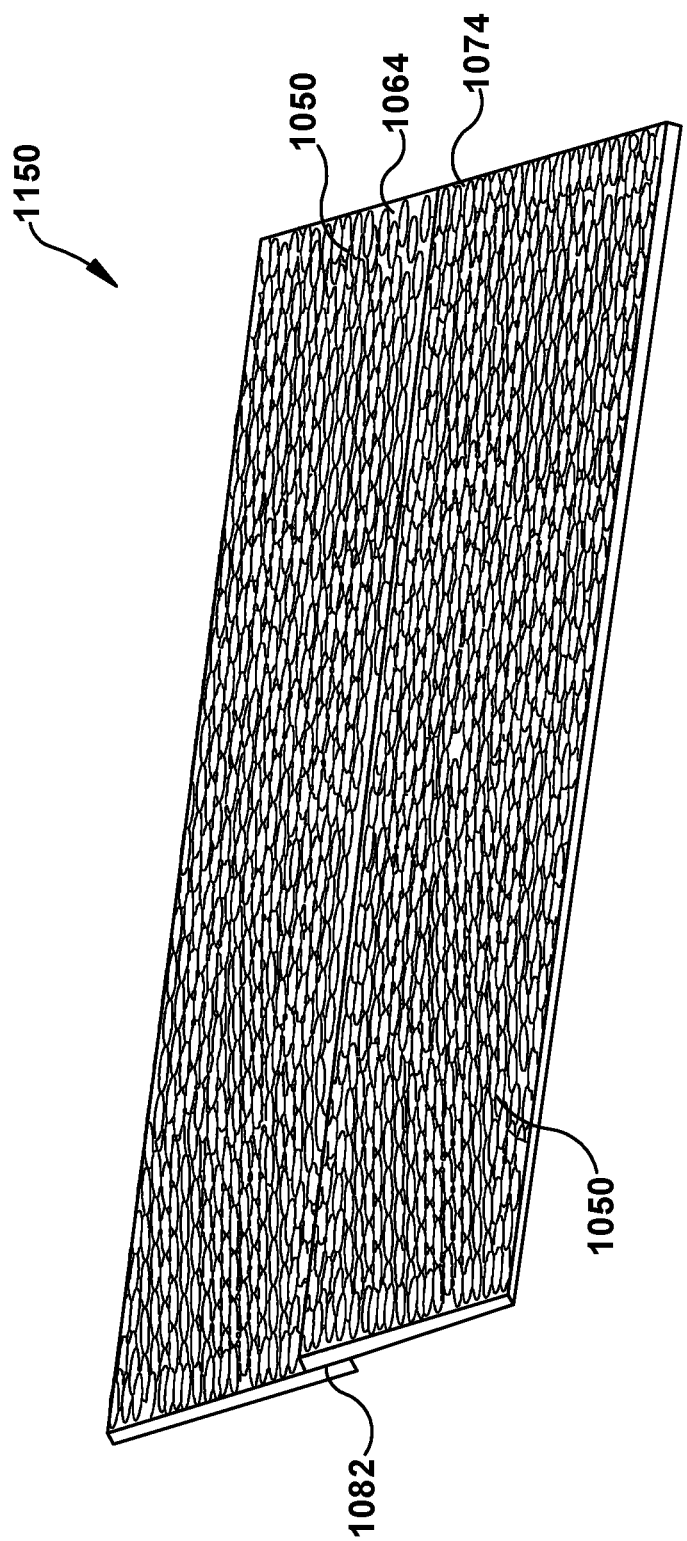
FIG. 9D is a bottom perspective view of an exemplary embodiment of a laminated shingle.

FIG. 9D illustrates another exemplary embodiment of a laminated shingle 1150. In this embodiment, the laminated shingle 1150 has a foam spacing layer 1050 attached to the bottom underlay surface 1074 and to a portion of the bottom overlay surface 1064. As seen in FIG. 9D, there is no foam spacing layer 1050 where the overlay sheet 1060 is attached to the underlay sheet 1070, which is referred to as the common bond area 1082.

Figure 9E:
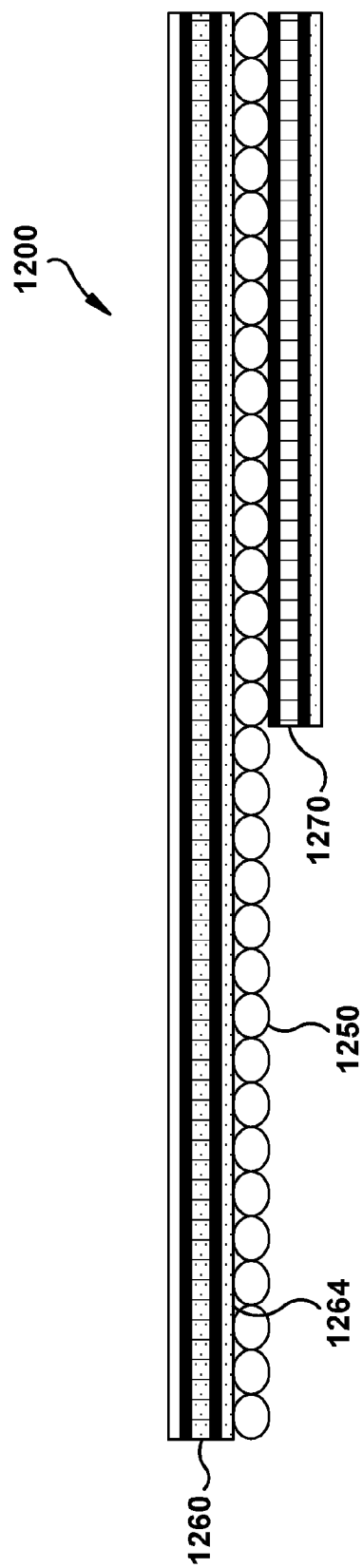
FIG. 9E is a side elevational view of an exemplary embodiment of a laminated shingle.
Figure 9F:
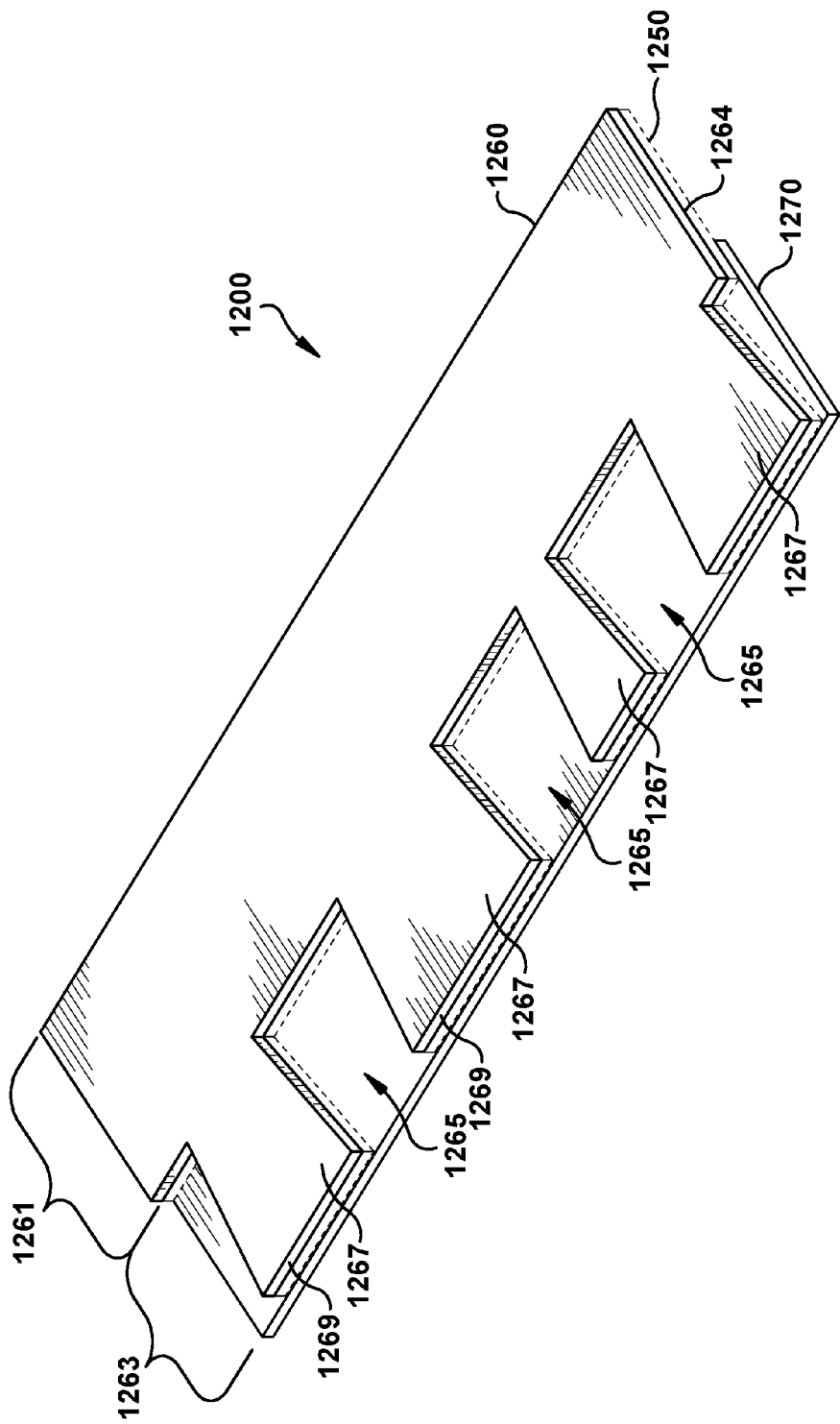
FIG. 9F is a top perspective view of the laminated shingle illustrated by FIG. 9E.
Figure 9G:
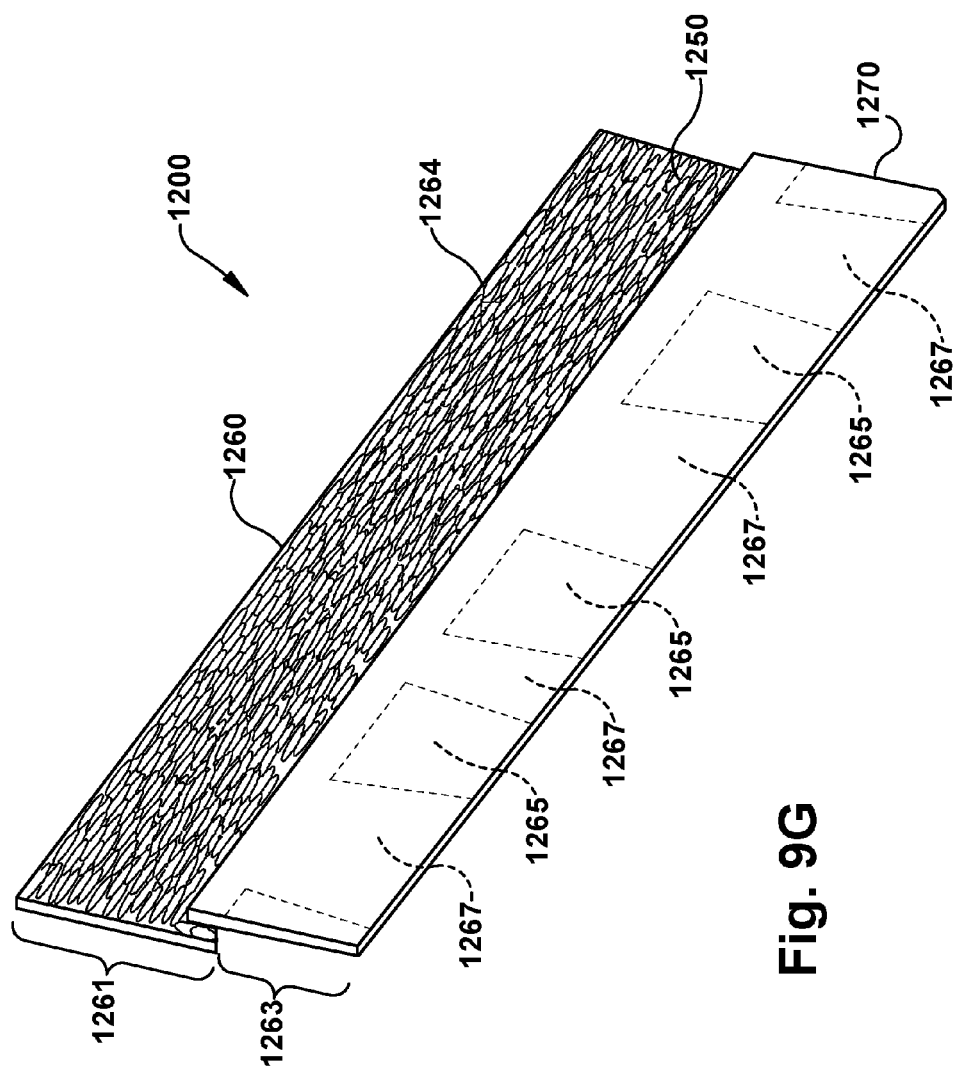
FIG. 9G is a bottom perspective view of the laminated shingle illustrated by FIG. 9E.

Referring now to FIGS. 9E, 9F, and 9G, another exemplary embodiment of a laminated shingle 1200 according to the present disclosure is illustrated. The laminated shingle 1200 includes an overlay sheet 1260 attached to an underlay sheet 1270. The overlay sheet 1260 includes a headlap portion 1261 and a tab portion 1263. In the illustrated embodiment, the overlay sheet 1260 includes cutouts 1265 defining four tabs 1267. Alternatively, any suitable number of cutouts 1265 and tabs 1267 may be formed in the overlay sheet 1260. Edges of the tabs 1267 define a leading edge 1269 of the overlay sheet 1260.

The embodiment of the laminated shingle 1200 shown in FIGS. 9E, 9F, and 9G has a foam spacing layer 1250 attached to the bottom overlay surface 1264. The foam spacing layer 1250 may be attached to the bottom overlay surface 1264 in a wide variety of configurations. For example, in certain embodiments, the dimensions (e.g., perimeter, length, width, area) of the spacing layer 1250 may be the same as the dimensions of the bottom overlay surface 1264 such that the foam spacing layer 1250 covers the bottom overlay surface 1264. In other embodiments, the dimensions of the foam spacing layer 1250 may be less than the dimensions of the bottom overlay surface 1264, such that the spacing layer 1250 covers only a portion of the bottom overlay surface 1264, such as a strip of the spacing layer 1250 that extends along the perimeter of the bottom overlay surface 1264.

In one embodiment, the laminated shingle includes tabs and the foam spacing layer is attached only to the portions of the bottom overlay surface that correspond to the tabs. In certain embodiments, the foam spacing layer attached to the portions of the bottom overlay surface that correspond to the tabs has a tapered thickness, with the thickest portion at the leading edge of the overlay sheet which tapers down as it approaches the headlap portion.

As described herein, when one or more components are described as being connected, joined, affixed, coupled, attached, adhered, or otherwise interconnected, such interconnection may be direct as between the components or may be indirect such as through the use of one or more intermediary components. Also as described herein, reference to a "member," "connector", "component," or "portion" shall not be limited to a single structural member, component, or element but can include an assembly of components, members or elements.

The above description of specific embodiments has been given by way of example. From the disclosure given, those skilled in the art will not only understand the general inventive concepts and attendant advantages, but will also find apparent various changes and modifications to the structures and methods disclosed. For example, the general inventive concepts are not typically limited to any particular roofing application. Thus, for example, use of the inventive concepts to both domestic and commercial roofing applications, are within the spirit and scope of the general inventive concepts. As another example, although the embodiments disclosed herein have been primarily directed to asphalt-based roofing shingles, the general inventive concepts could be readily extended to any roofing material which could benefit from the general inventive concepts described herein. Furthermore, the general inventive concepts could be readily applied to various shingle designs, such as for example, single layer, three tab shingles or multi-layer, laminate shingles. It is sought, therefore, to cover all such changes and modifications as fall within the spirit and scope of the general inventive concepts, as described and claimed herein, and equivalents thereof.

What is claimed is:

1. A shingle comprising:
   a substrate having a top surface and a bottom surface;
   a polymer foam applied to the substrate;
   an asphalt layer covering at least a portion of the top surface; and
   a layer of granules adhered to the asphalt layer;
   wherein the polymer foam covers at least a portion of the bottom surface;
   wherein the polymer foam is at least one of a polyolefin foam, a polyurethane foam, a polystyrene foam, a polyisocyanurate foam, or an acrylic foam; and
   wherein the polymer foam covers at least a portion of the top surface and at least partially impregnates the top surface, and wherein the asphalt layer covers the polymer foam on the top surface and at least partially impregnates the top surface.

2. The shingle of claim 1, wherein at least a portion of the polymer foam on the top surface is collapsed.

3. The shingle of claim 1, wherein at least a portion of the polymer foam on the bottom surface is collapsed.

4. The shingle of claim 1, wherein the bottom surface is free of asphalt.

* * * * *